(12) United States Patent
Mizusaki et al.

(10) Patent No.: US 10,503,021 B2
(45) Date of Patent: Dec. 10, 2019

(54) SUBSTRATE PROVIDED WITH ALIGNMENT FILM AND LIQUID CRYSTAL DISPLAY DEVICE

(71) Applicant: SHARP KABUSHIKI KAISHA, Sakai, Osaka (JP)

(72) Inventors: Masanobu Mizusaki, Sakai (JP); Tsuyoshi Okazaki, Sakai (JP); Yuko Teraoka, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 16/249,121

(22) Filed: Jan. 16, 2019

(65) Prior Publication Data
US 2019/0227386 A1 Jul. 25, 2019

(30) Foreign Application Priority Data
Jan. 23, 2018 (JP) .................. 2018-008869

(51) Int. Cl.
*G02F 1/1337* (2006.01)
*C08G 77/38* (2006.01)

(52) U.S. Cl.
CPC ........ *G02F 1/133711* (2013.01); *C08G 77/38* (2013.01); *G02F 1/1337* (2013.01); *Y10T 428/1005* (2015.01); *Y10T 428/1014* (2015.01); *Y10T 428/1023* (2015.01)

(58) Field of Classification Search
CPC ......... Y10T 428/1005; Y10T 428/1014; Y10T 428/1023; G02F 1/1337; G02F 1/133711; C08G 77/38
See application file for complete search history.

(56) References Cited

U.S. PATENT DOCUMENTS

2006/0204680 A1* 9/2006 Hattori .................. C09K 19/56
428/1.23
2012/0249940 A1* 10/2012 Choi ................. G02F 1/133753
349/123

FOREIGN PATENT DOCUMENTS

JP          5556482 B2     7/2014

* cited by examiner

*Primary Examiner* — Sophie Hon
*Assistant Examiner* — Sow Fun Hon
(74) *Attorney, Agent, or Firm* — ScienBiziP, P.C.

(57) ABSTRACT

A substrate provided with an alignment film includes: a substrate including an electrode on a surface thereof; and an alignment film in contact with the electrode. The alignment film contains a first polymer that contains a polysiloxane structure in a side chain and a second polymer that contains a photo-reactive group or a vertically aligning functional group. The alignment film includes a first surface that is placed on a side close to the electrode and contains the first polymer and a second surface that is placed on a side opposite to the first surface and contains the second polymer. The first polymer has a weight that is equal to or greater than a weight of the second polymer in the alignment film.

10 Claims, 5 Drawing Sheets

SUBSTRATE PROVIDED WITH ALIGNMENT FILM AND LIQUID CRYSTAL DISPLAY DEVICE

CROSS-REFERENCE TO RELATED APPLICATION

The present application claims priority under 35 U.S.C. § 119 to Japanese Patent Application No. 2018-008869 filed on Jan. 23, 2018, the contents of which are incorporated herein by reference in their entirety.

BACKGROUND OF THE INVENTION

Field of the Invention

The present invention relates to a substrate provided with an alignment film and a liquid crystal display device including the substrate provided with an alignment film.

Description of Related Art

Liquid crystal display devices are display devices which utilize a liquid crystal composition in order to provide display. In a typical display mode thereof, a liquid crystal panel containing a liquid crystal composition between paired substrates is irradiated with light from a backlight and voltage is applied to the liquid crystal composition so that the alignment of liquid crystal molecules is changed, whereby the amount of light passing through the liquid crystal panel is controlled.

In a liquid crystal display device, the alignment of liquid crystal molecules with no voltage applied is typically controlled by an alignment film. The alignment films may be obtained by applying a liquid crystal alignment agent to a substrate and performing alignment treatment on the layer formed, for example.

For example, JP 5556482 B discloses a liquid crystal alignment agent for vertical alignment containing a polyamic acid or a derivative thereof obtainable by reacting a tetracarboxylic dianhydride represented by the following formula (Q) with a diamine having a side chain structure represented by the following formula (V-2) or a mixture of the diamine having a side chain structure represented by the formula (V-2) and another diamine. The document also discloses that the tetracarboxylic dianhydride contains a silsesquioxane dianhydride and that a particularly preferred specific example thereof is a compound represented by the following formula (S-1).

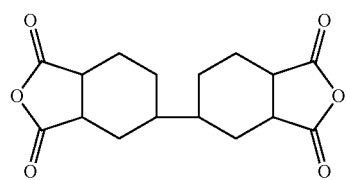

(Q)

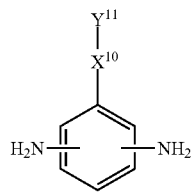

(V-2)

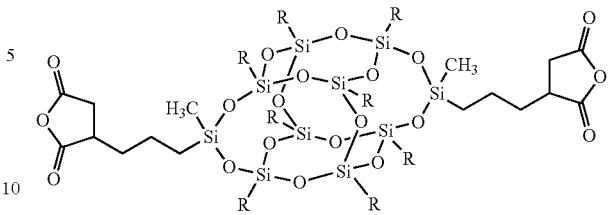

(S-1)

BRIEF SUMMARY OF THE INVENTION

A liquid crystal display device includes a liquid crystal panel provided with paired substrates. The liquid crystal panel may have a structure including an array substrate provided with a pixel electrode, a counter substrate provided with a counter electrode that faces the pixel electrode, and a liquid crystal layer containing a liquid crystal composition between the substrates; or a structure including an array substrate provided with a pixel electrode and a counter electrode and a counter substrate provided with no electrode, for example.

The liquid crystal display device provides display when voltage is applied between the pixel electrode and the counter electrode and the alignment state of liquid crystal molecules in the liquid crystal layer is changed. FIG. 6 is a schematic diagram of a change in voltage applied to one pixel from a pixel electrode and a counter electrode. In FIG. 6, the hatched portions indicate the waveforms of voltage applied to the pixel electrode, while the dotted line indicates the waveform of voltage applied to the counter electrode. As shown in FIG. 6, in order to allow the liquid crystal display device to provide display, the counter (common) electrode supplies a constant voltage while the pixel electrode supplies a square wave voltage (pulse voltage) in accordance with the frequency and the resolution in each pixel (display unit). An alignment film for controlling the alignment of liquid crystal molecules is placed on a surface of one or each of the pixel electrode and the counter electrode. The alignment film may be a dielectric formed from a polymer, for example. The studies performed by the present inventors show that a contact between the pixel electrode and the dielectric may cause injection of free electrons (carriers) into the polymer constituting the dielectric at the moment when the applied voltage value changes, resulting in an electric charge interaction.

The pixel resolution has been increased for current liquid crystal display devices. For example, in the case of 60-Hz full high definition, one frame is 16.7 ms and the pulse width of the waveform of voltage applied to the pixel electrode is as short as 15 ms. The present inventors found that injection of carriers from the pixel electrode into the dielectric (alignment film) tends to occur more easily as the voltage is applied to the pixel electrode at a higher frequency. The present inventors further performed studies to find the following. That is, long-term use of the liquid crystal display device causes continual injection of carriers from the pixel electrode into the alignment film. This leads to a reduction in voltage holding ratio of the liquid crystal display device and an increase in the residual DC voltage, resulting in occurrence of image sticking (DC image sticking).

The present invention has been made in view of the above current state of the art and aims to provide a substrate provided with an alignment film with reduced injection of carriers from an electrode into an alignment film, and a liquid crystal display device capable of maintaining a high voltage holding ratio for a long period of time and thereby reducing generation of image sticking.

In order to reduce image sticking caused when a liquid crystal display device is used for a long period of time, the present inventors examined a method of reducing injection of carriers from a pixel electrode into an alignment film, specifically, a method of covering a surface of the pixel electrode with a non-dielectric.

An example of the method of covering the surface of the pixel electrode with a non-dielectric may be a method of adding an inorganic compound to a liquid crystal alignment agent constituting the alignment film. Still, this method fails to distribute the inorganic compound uniformly in the alignment film and to cover the surface of the pixel electrode uniformly. Thus, injection of carriers cannot be reduced sufficiently.

Another example of the method may be a method of covering the surface of the pixel electrode with an inorganic compound and then forming an alignment film thereon. Still, this method includes an increased number of steps and requires a vacuum process such as deposition so as to apply the inorganic compound. Thus, the method cannot be applied to production of a large liquid crystal display device.

The present inventors repeated studies, and focused on a method in which a liquid crystal alignment agent prepared by mixing two polymer materials is used to form a two-layer alignment film with a first surface on a side close to the electrode and a second surface on a side opposite to the first surface. As a result, they found that introduction of a polysiloxane structure, which is an inorganic component, into a side chain of the first polymer constituting the first surface enables easy distribution of the inorganic component on the surface of the electrode. The present inventors also found that the polysiloxane structure can sufficiently be distributed on the surface of the electrode by adjusting the weight of the first polymer in the alignment film to be equal to or greater than the weight of the second polymer constituting the second surface, whereby injection of carriers from the electrode into the alignment film can be reduced. Consequently, the present inventors arrived at the solution to the above problems, completing the present invention.

In other words, an aspect of the present invention relates to a substrate provided with an alignment film, including: a substrate including an electrode on a surface thereof; and an alignment film in contact with the electrode, the alignment film containing a first polymer that contains a polysiloxane structure in a side chain and a second polymer that contains a photo-reactive group or a vertically aligning functional group, the alignment film including a first surface that is placed on a side close to the electrode and contains the first polymer and a second surface that is placed on a side opposite to the first surface and contains the second polymer, the first polymer having a weight that is equal to or greater than a weight of the second polymer in the alignment film.

Another aspect of the present invention relates to a liquid crystal display device including, in the stated order: an array substrate including a pixel electrode; an alignment film in contact with the pixel electrode; a liquid crystal layer containing a liquid crystal molecule; and a counter substrate including a counter electrode, the array substrate and the alignment film constituting a stack, the stack being the substrate provided with an alignment film of the present invention.

The substrate provided with an alignment film of the present invention can prevent injection of carriers from the electrode into the alignment film. The liquid crystal display device of the present invention, which includes the substrate provided with an alignment film of the present invention as a stack of the array substrate and the alignment film, can maintain the voltage holding ratio for a long period of time, and thus can reduce generation of image sticking.

DETAILED DESCRIPTION OF THE INVENTION

Figure 1:
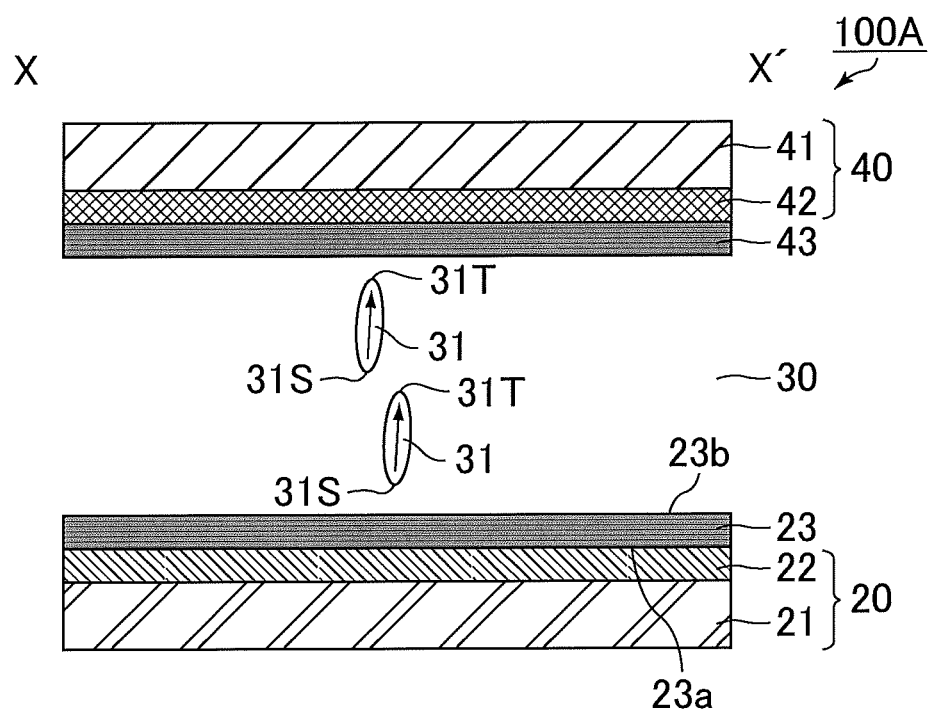
FIG. 1 is a schematic cross-sectional view of an example of a liquid crystal display device of Embodiment 1.

Hereinafter, embodiments of the present invention are described. The contents of the following embodiments are not intended to limit the scope of the present invention, and the design may appropriately be changed within the spirit of the present invention.

(Substrate Provided with Alignment Film)

An aspect of the present invention relates to a substrate provided with an alignment film including a substrate including an electrode on a surface thereof; and an alignment film in contact with the electrode. The alignment film contains a first polymer that contains a polysiloxane structure in a side chain and a second polymer that contains a photo-reactive group or a vertically aligning functional group. The alignment film includes a first surface that is placed on a side close to the electrode and contains the first polymer and a second surface that is placed on a side opposite to the first surface and contains the second polymer. The first polymer has a weight that is equal to or greater than the weight of the second polymer in the alignment film.

The alignment film has a function of controlling the alignment of liquid crystal molecules in the liquid crystal layer when brought into contact with the liquid crystal layer. The alignment film contains a first polymer that contains a polysiloxane structure in a side chain and a second polymer that contains a photo-reactive group or a vertically aligning functional group. The presence of two polymers as materials of the alignment film can provide a two-layer alignment film. The two-layer alignment film does not include two completely separated layers. The concentrations of the first and second polymers gradually change in the thickness direction of the alignment film. For example, when the first surface of the alignment film contains the first polymer, the concentration of the first polymer in the thickness direction of the alignment film gradually decreases from the first surface toward the second surface placed on a side opposite to the first surface. In contrast, when the second surface of the alignment film contains the second polymer, the concentration of the second polymer in the thickness direction of the alignment film gradually decreases from the second surface toward the first surface.

The alignment film includes the first surface that is placed on a side close to the electrode and that contains the first polymer. The polysiloxane structure has high affinity with the electrode and the substrate. Thus, in the steps such as application of the liquid crystal alignment agent containing the first polymer and the second polymer to the substrate surface, drying of the applied layer, and baking of the dried layer, the first polymer containing a polysiloxane structure in a side chain is phase-separated toward the side close to the electrode (side close to the substrate) to form the first surface, while the second polymer forms the second surface on the side opposite to the first surface. The composition of the alignment film may be analyzed by time-of-flight secondary ion mass spectrometry (TOF-SIMS), for example. The presence of the polysiloxane structure can be confirmed by analyzing the alignment film in the thickness direction by TOF-SIMS and detecting the components derived from the —Si—O— group unique to the polysiloxane structure on the electrode surface.

The first polymer contains a polysiloxane structure in a side chain. The polysiloxane structure introduced into a side chain of the first polymer can have improved motility and is more likely to adsorb on the surfaces of the electrode and the substrate. The substrate provided with an alignment film of the present invention, in which the surface of the electrode is coated with an inorganic component (polysiloxane structure) having high insulation, can prevent injection of carriers from the electrode into the alignment film. Thus, the substrate provided with an alignment film of the present invention, when applied to a liquid crystal display device, is less likely to cause a change in resistance of the alignment film even when the liquid crystal display device is used for a long period of time, preventing a change in residual DC value over time. This can lead to a liquid crystal display device which reduces occurrence of DC image sticking (afterimage) and has high long-term reliability. The area where the first surface of the alignment film and the electrode overlap each other is preferably as large as possible, but the whole electrode needs not to be covered with the polysiloxane structure.

In JP 5556482 B, a silsesquioxane group is present in the main chain of a polyamic acid or a derivative thereof. The silsesquioxane group present in the main chain has significantly reduced motility than the silsesquioxane group present in a side chain, and thus the contact efficiency of the silsesquioxane group to the electrode surface may probably be low.

The alignment film includes the second surface that is placed on a side opposite to the first surface and that contains the second polymer. The second surface of the alignment film is a surface to be in contact with the liquid crystal layer when the substrate provided with an alignment film of the present invention is applied to a liquid crystal display device. The second polymer contains a photo-reactive group or a vertically aligning functional group. Thus, the second surface containing the second polymer enables control of the alignment azimuth of liquid crystal molecules contained in the liquid crystal layer.

The polysiloxane structure may be a silsesquioxane group. The silsesquioxane group may be a structure represented by the following formula (1). The structure represented by the formula (1) is a cage-shaped silsesquioxane group. In order to achieve easy introduction of the structure into a side chain of the first polymer, the polysiloxane structure is preferably a cage-shaped silsesquioxane group.

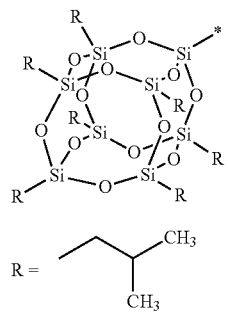

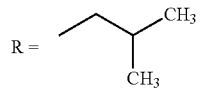

In the formula, R is the structure represented by the formula (1-a).

The amount of the polysiloxane structure (side chain) introduced into the first polymer may be 0.1 to 20 mol % relative to the whole first polymer, for example. Less than 0.1 mol % of the side chain introduced may fail to achieve the effects of introducing the polysiloxane structure and to coat the surface of the electrode sufficiently. More than 20 mol % of the side chain introduced may cause reduced solubility of the first polymer, causing a difficulty in dissolving the first polymer in a solvent.

The polysiloxane structure preferably contains an amide group between the main chain of the first polymer and the silsesquioxane group represented by the formula (1). The amide group has high affinity with indium tin oxide (ITO) and indium zinc oxide (IZO) used as transparent electrode materials. Thus, the presence of an amide group in a side chain of the first polymer enables easy distribution of the polysiloxane structure near the electrode.

An example of the structure including an amide group between the main chain of the first polymer and the silsesquioxane group is a structure represented by the following formula (1-1):

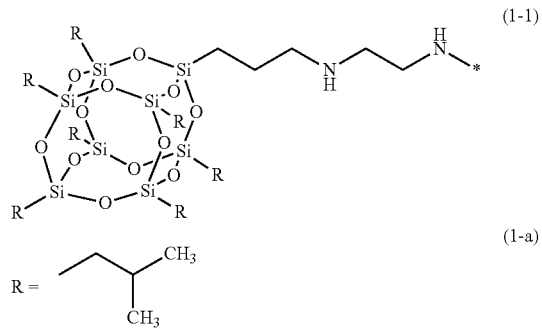

wherein R is the structure represented by the formula (1-a).

For the alignment film containing a material that is less likely to cause an electric charge interaction, such as an inorganic material, no electron transfer occurs between the electrode and the inorganic alignment film and therefore no electric charge interaction occurs even when voltage applied from the electrode changes. Thus, the material constituting the alignment film is not ionized. Accordingly, the presence of a dielectric as the alignment film can sufficiently lead to the effects of the invention. The alignment film material constituting the dielectric may be a polymer containing a main chain derived from, for example, a polyamic acid, a polyimide, or a polysiloxane.

The main chain of the first polymer may be derived from either a polyamic acid or a polyimide. The polyimide is obtainable by dehydration and cyclization of carboxyl groups in an amic acid (amide acid) contained in a polyamic acid by heating, for example, followed by imidization. In the present description, a polyamic acid with an imidization percentage of 50% or higher is defined as a polyimide. A polyamic acid or a polyimide synthesized by polycondensation can be easily phase-separated by adjusting the degree of polymerization, and thus can suitably be used to provide the main chain of the first polymer constituting the first surface (lower side) of the alignment film.

The first polymer may contain a structure in which the main chain is derived from a polyamic acid represented by the following formula (2):

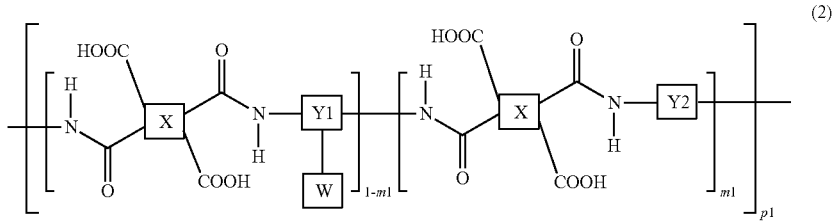

wherein

X is a structure represented by any of the following formulae (X-1) to (X-12);

Y1 is a structure represented by any of the following formulae (Y1-1) to (Y1-16);

Y2 is a structure represented by the following formula (Y2-1);

W is a side chain;

m1 is a real number greater than 0 and smaller than 1; and p1 represents the number of repeats, and is an integer of 1 or greater.

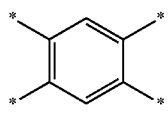 (X-1)

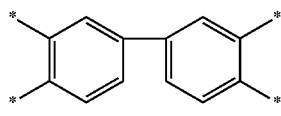 (X-2)

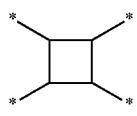 (X-3)

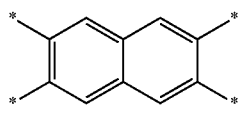 (X-4)

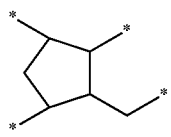 (X-5)

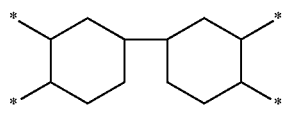 (X-6)

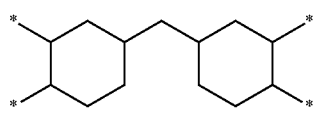 (X-7)

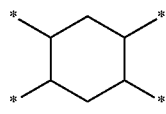 (X-8)

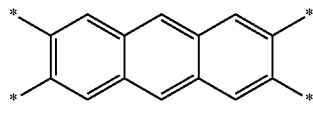 (X-9)

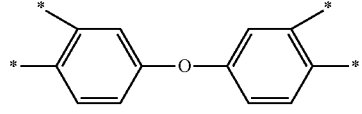 (X-10)

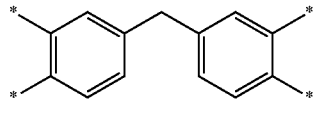 (X-11)

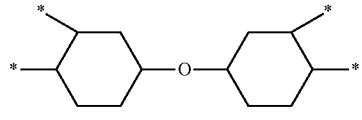 (X-12)

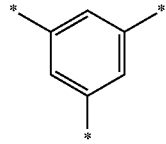 (Y1-1)

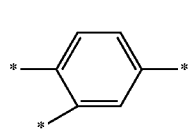 (Y1-2)

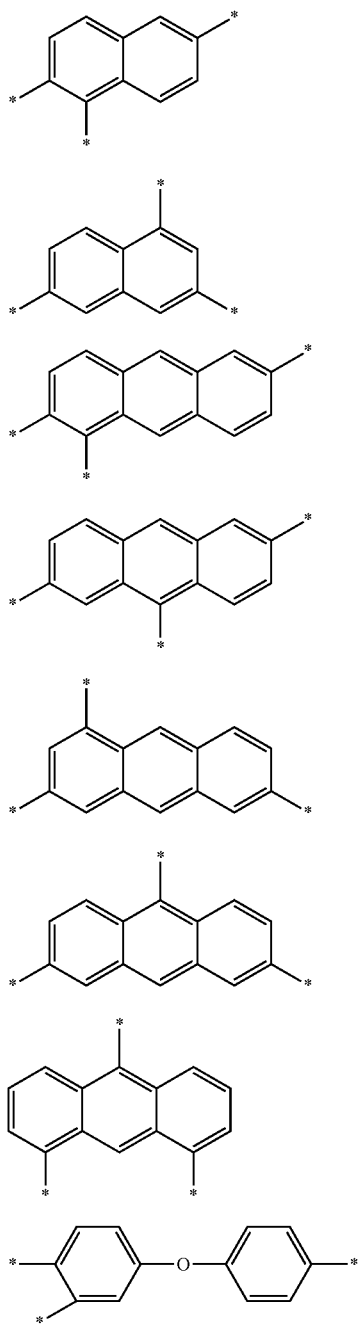
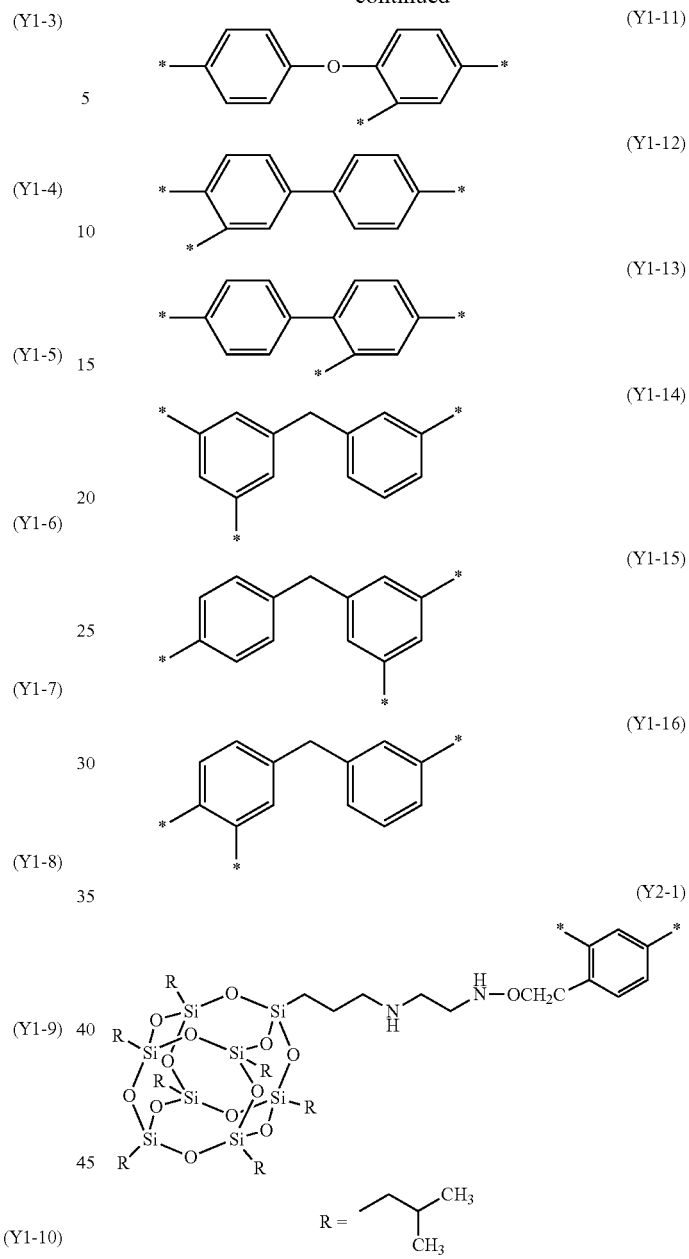
The first polymer may have a structure in which the main chain is derived from a polyimide represented by the following formula (3):
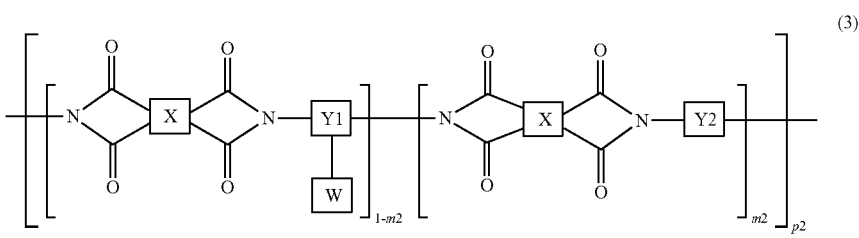

wherein

X is a structure represented by any of the formulae (X-1) to (X-12);

Y1 is a structure represented by any of the formulae (Y1-1) to (Y1-16);

Y2 is the structure represented by the formula (Y2-1);

W is a side chain;

m2 is a real number greater than 0 and smaller than 1; and p2 represents the number of repeats, and is an integer of 1 or greater.

The first polymer preferably contains an aligning functional group. The aligning functional group is more preferably introduced into side chains W in the formulae (2) and (3). One species of an aligning functional group may be introduced into side chains W, or two or more species thereof may be introduced thereinto. The aligning functional group in the first polymer may be either a horizontally aligning functional group or a vertically aligning functional group. The terms "horizontally aligning functional group" and "vertically aligning functional group" as used herein each mean a functional group that exerts an alignment controlling force to align liquid crystal molecules in the liquid crystal layer substantially horizontally or substantially vertically to the alignment film when the substrate provided with an alignment film of the present invention is applied to a liquid crystal display device and in a no-voltage application state in which no voltage is applied to the liquid crystal layer. The term "substantially horizontally" means that the pre-tilt angle is preferably ° or smaller, more preferably 5° or smaller, still more preferably 2° or smaller. The term "substantially vertically" means that the pre-tilt angle is preferably 83° or greater, more preferably 85° or greater. With a vertically aligning functional group, the pre-tilt angle of the liquid crystal molecules is particularly preferably 87.5° to 88.0°. The "pre-tilt angle" as used herein means the angle of inclination of a liquid crystal molecule from (the angle of the major axis of a liquid crystal molecule formed with) the direction parallel to the substrate surface provided with the alignment film, with the angle parallel to the substrate surface being 0° and the angle of the normal direction of the substrate surface being 90°.

The aligning functional group in the first polymer may be a photo-reactive group containing a photo-reactive moiety. The photo-reactive moiety means a structure that may undergo a structural change when irradiated with light (electromagnetic waves) such as ultraviolet light or visible light. The structural change of the photo-reactive moiety may be, for example, dimerization (formation of dimers), isomerization, photo-Fries rearrangement, or decomposition. Such a structural change of the photo-reactive moiety allows the alignment film to exert the alignment-controlling force or enables change in alignment-controlling force level and/or direction of the alignment film. The alignment-controlling force is an ability to control the alignment of nearby liquid crystal molecules. The photo-reactive group as used herein includes functional groups containing a photo-reactive moiety among the horizontally aligning functional groups and the vertically aligning functional groups. An alignment film containing the first polymer that contains a photo-reactive group and/or a second polymer that contains a photo-reactive group is also referred to as a photo-alignment film in the present description.

According to the studies by the present inventors, the presence of a photo-alignment film is likely to cause injection of carriers from the electrode into the photo-alignment film and more significantly causes a reduction in voltage holding ratio (VHR) due to long-term use of a liquid crystal display device and image sticking due to an increase in residual DC voltage (rDC). The substrate provided with an alignment film of the present invention allows a polysiloxane structure that is an inorganic component to distribute easily on the electrode surface, and thus can reduce injection of carriers from an electrode into the alignment film. Thereby, use of a photo-alignment film as the alignment film can more effectively reduce a decrease in VHR and occurrence of image sticking.

The following describes the reason why the presence of a photo-alignment film easily causes a decrease in VHR and occurrence of image sticking. Most of photo-reactive groups have a n-conjugated structure as a photo-reactive moiety, and thus relatively easily cause transfer of electrons. If the electrode and a photo-reactive group are in contact with each other, electrons are injected from the electrode into the photo-reactive moiety or the electrode receives electrons from the photo-reactive moiety at the moment when the voltage value applied to the electrode changes. In the presence of a photo-alignment film, such electron transfer occurs and the resistance of the photo-alignment film changes in driving of the liquid crystal display device, generating unevenness in the adsorption density of ionic impurities present in the liquid crystal layer on the surface of the photo-alignment film. This causes a partial change in residual DC voltage of the photo-alignment film and more significant occurrence of image sticking. Further, such electron transfer causes continual oxidation-reduction reactions and finally generation of ions from the photo-reactive group, easily causing deterioration in electric properties of the liquid crystal display device, such as a decrease in VHR.

Examples of a functional group containing no photo-reactive moiety among the horizontally aligning functional groups include the structures represented by any of the following formulae (W-1-1) to (W-1-8).

(W-1-1)

(W-1-2)

(W-1-3)

(W-1-4)

(W-1-5)

(W-1-6)

(W-1-7)

(W-1-8)

Examples of a functional group containing no photo-reactive moiety among the vertically aligning functional groups include the structures represented by any of the following formulae (W-2-1) to (W-2-7).

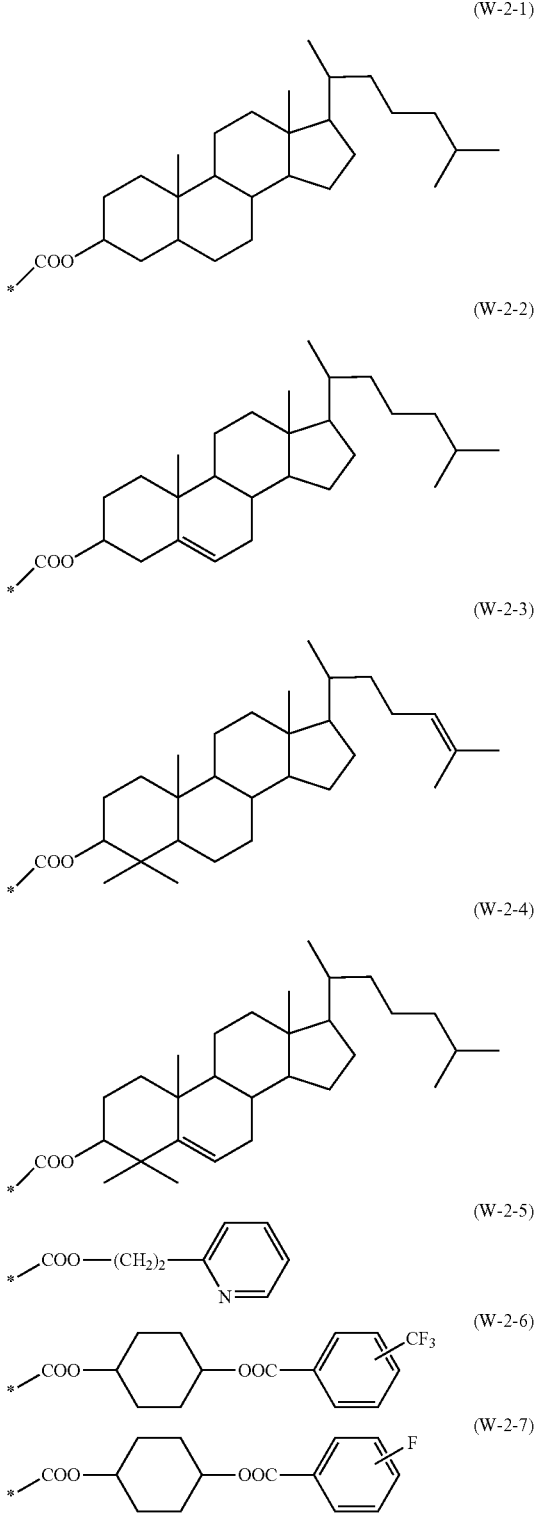

the formulae (W-2-5) to (W-2-7). Examples of the vertically aligning functional group containing a cholesterol group include the structures represented by the formulae (W-2-1) to (W-2-4).

Examples of a functional group containing a photo-reactive moiety among the horizontally aligning functional groups include the structures represented by any of the following formulae (W-3-1) to (W-3-6). The horizontally aligning functional group containing a photo-reactive moiety as used herein is also referred to as a "horizontally photo-aligning functional group". The structures represented by the following formulae (W-3-1) to (W-3-3) are examples of horizontally photo-aligning functional groups containing a cinnamate group. The structure represented by the following formula (W-3-4) is an example of a horizontally photo-aligning functional group containing a chalcone group. The structure represented by the following formula (W-3-5) is an example of a horizontally photo-aligning functional group containing an azobenzene group. The structure represented by the following formula (W-3-6) is an example of a horizontally photo-aligning functional group containing a coumarin group.

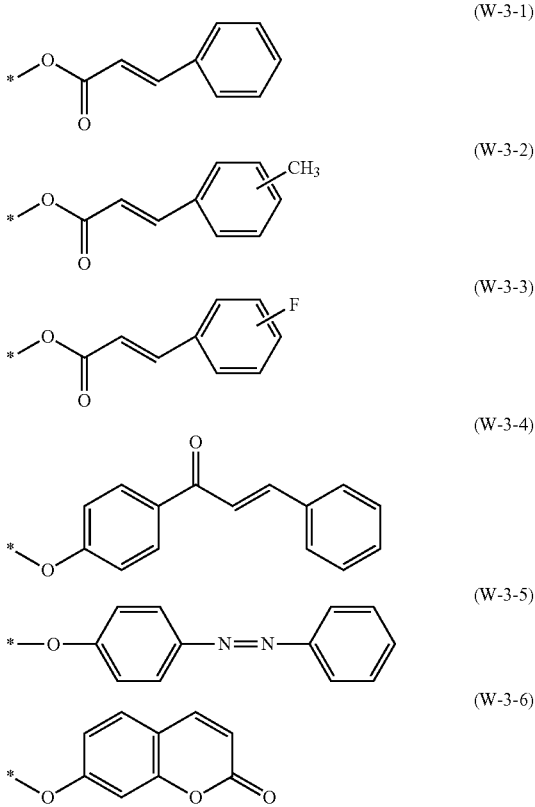

The vertically aligning functional group may contain an alkyl group or a cholesterol group. The vertically aligning functional group containing an alkyl group preferably contains a phenyl group or a pyridine skeleton, more preferably a phenyl group or a pyridine skeleton and an ester bond. Examples of the vertically aligning functional group containing an alkyl group include the structures represented by Examples of a functional group containing a photo-reactive moiety among the vertically aligning functional groups include the structures represented by any of the following formulae (W-4-1) to (W-4-24). The vertically aligning functional group containing a photo-reactive moiety as used herein is also referred to as a "vertically photo-aligning functional group". The structures represented by the following formulae (W-4-1) to (W-4-21) are examples of vertically photo-aligning functional groups containing a cinnamate group. The structure represented by the following formula (W-4-22) is an example of a vertically photo-aligning functional group containing a chalcone group. The structure represented by the following formula (W-4-23) is an example of a vertically photo-aligning functional group containing an azobenzene group. The structure represented by the following formula (W-4-24) is an example of a vertically photo-aligning functional group containing a coumarin group.
(W-4-1)
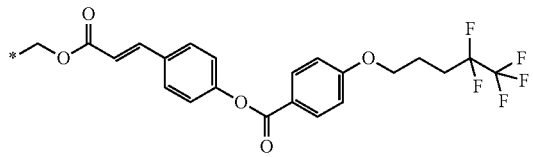
(W-4-2)
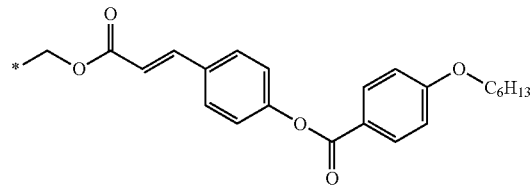
(W-4-3)
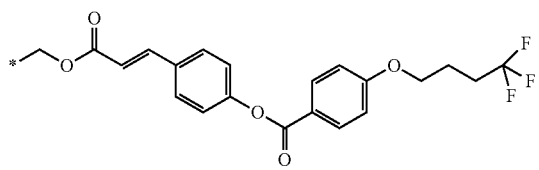
(W-4-4)
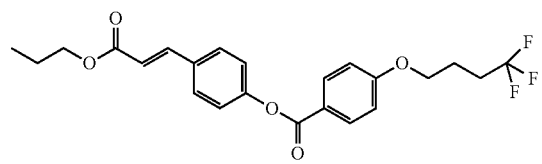
(W-4-5)
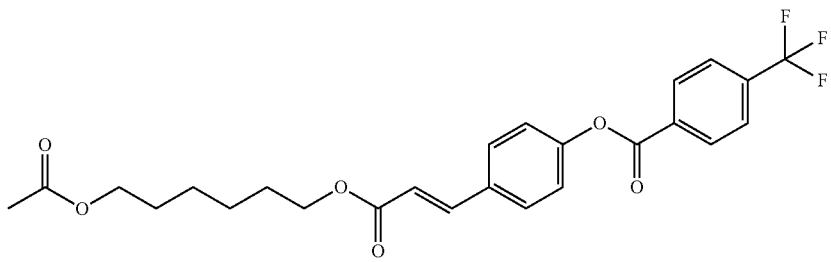
(W-4-6)
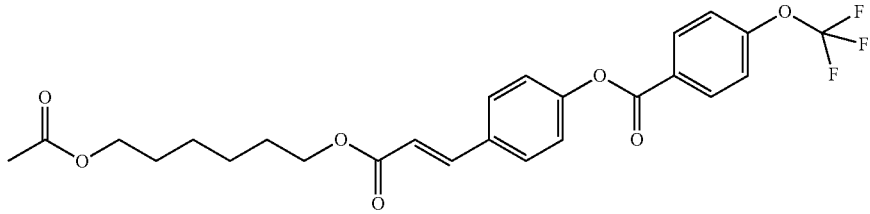
(W-4-7)
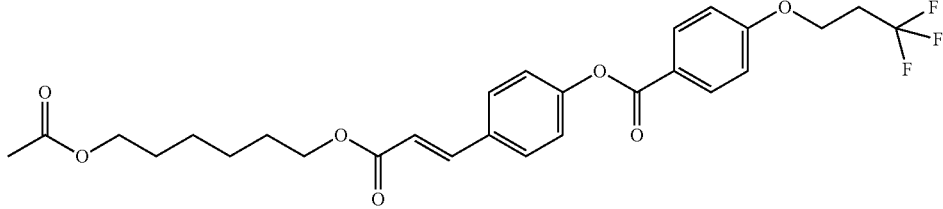
(W-4-8)
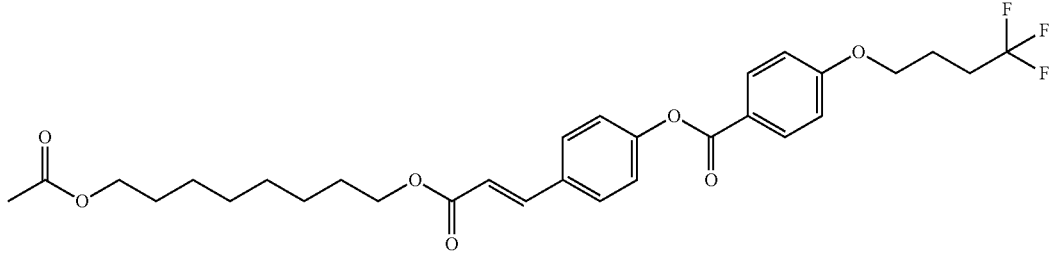

-continued
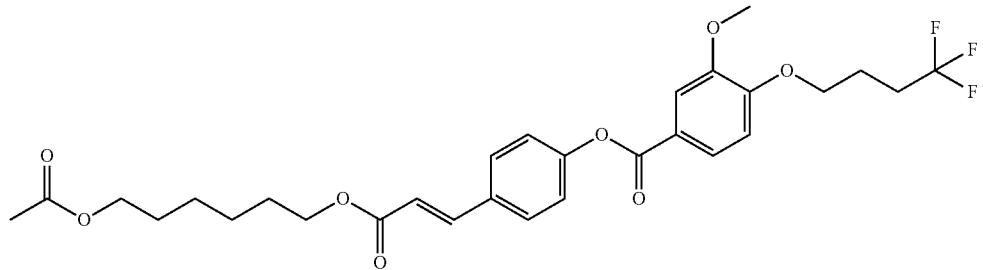
(W-4-9)
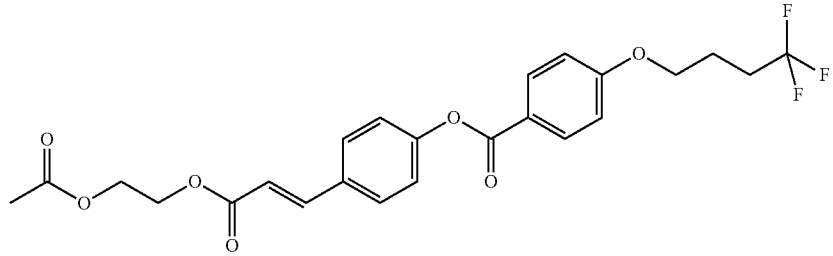
(W-4-10)
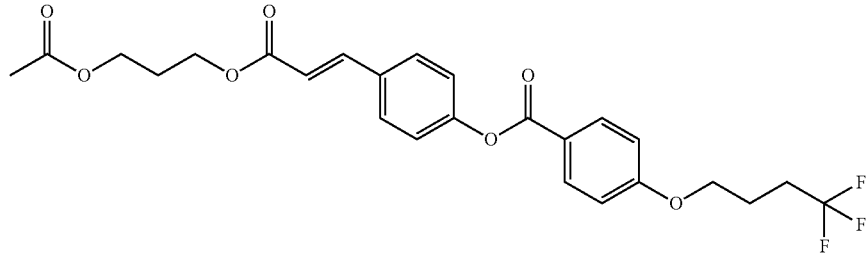
(W-4-11)
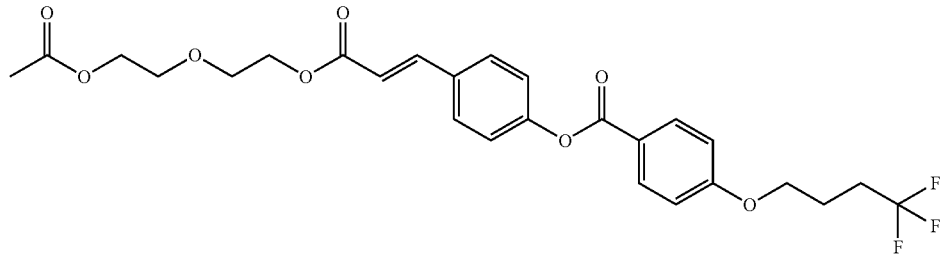
(W-4-12)
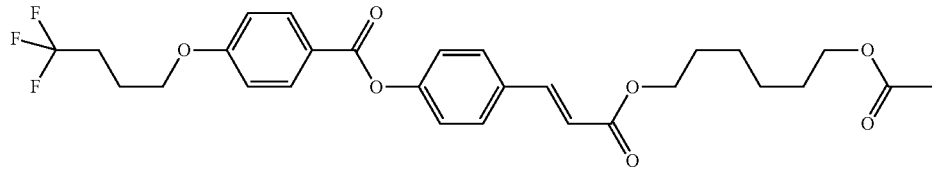
(W-4-13)
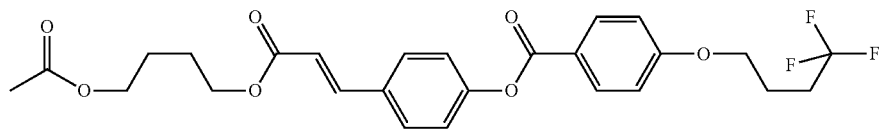
(W-4-14)
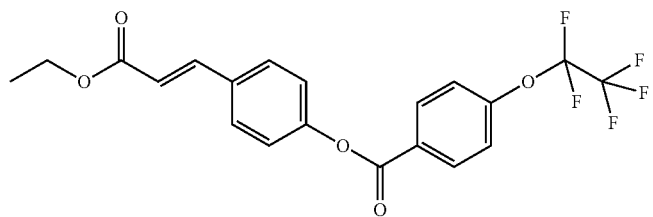
(W-4-15)

-continued
(W-4-16)
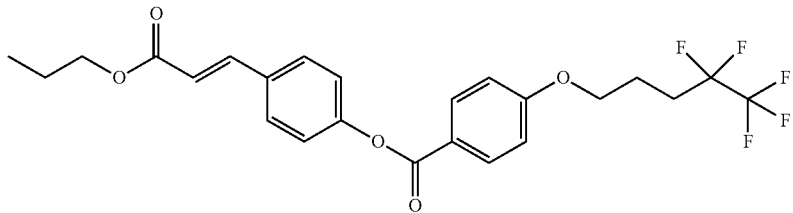
(W-4-17)
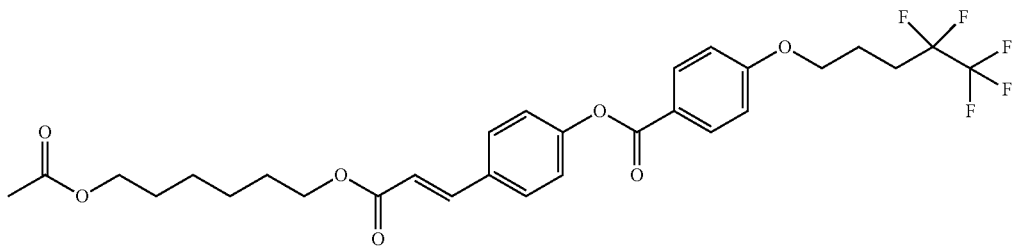
(W-4-18)
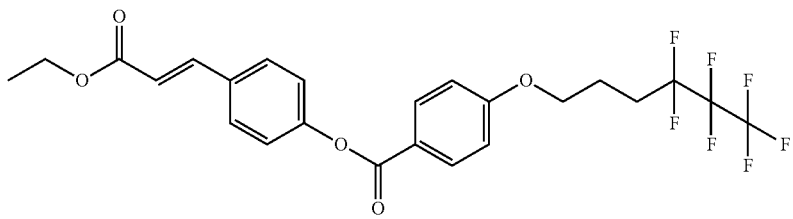
(W-4-19)
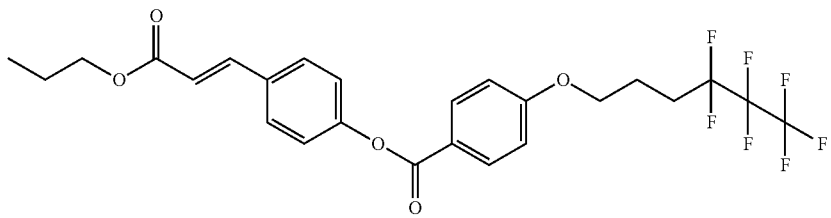
(W-4-20)
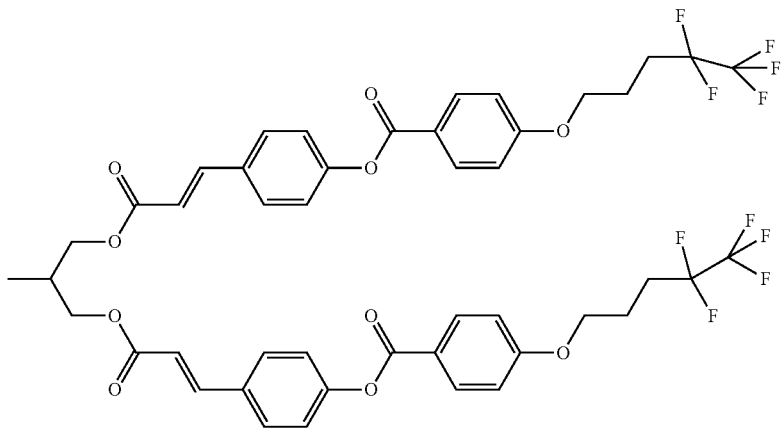

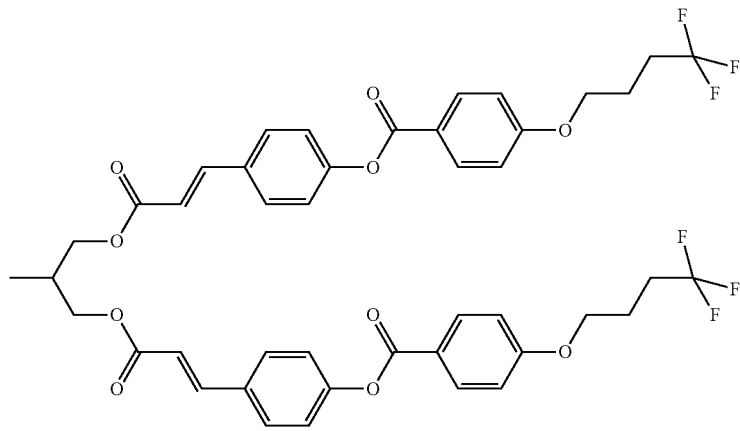
(W-4-21)

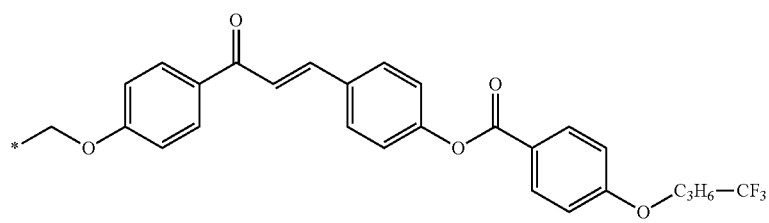
(W-4-22)

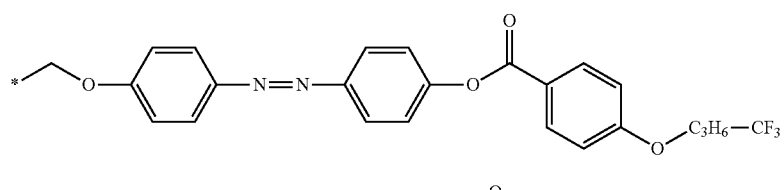
(W-4-23)

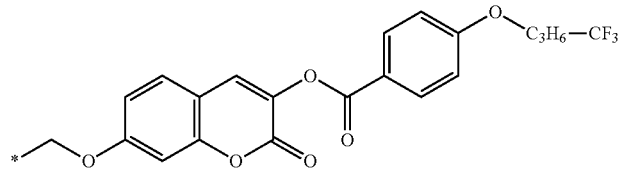
(W-4-24)

The photo-reactive group is preferably one containing a n-conjugated structure, such as an aromatic group, as a photo-reactive moiety. Examples of the photo-reactive group containing an aromatic group include the cinnamate, chalcone, azobenzene, and coumarin groups. The cinnamate, chalcone, azobenzene, and coumarin groups each contain a developed n-conjugated structure. Thus, electron transfer is likely to occur between the group and the electrode and the resistance of the photo-alignment film changes, so that partially uneven DC offset voltage is likely to occur. Accordingly, the presence of a cinnamate group, a chalcone group, an azobenzene group, or a coumarin group as a photo-reactive group can more effectively reduce a decrease in VHR and occurrence of image sticking. The "DC offset voltage" means, for example, to what extent the steady voltage applied from the common electrode shifts from the ground state (0 V) when a constant voltage is applied from the pixel electrode. The presence of different DC offset voltages at different positions within the display area may easily cause image sticking.

The first polymer may contain a structure represented by the formula (2) or a structure represented by the formula (3).

In the formulae (2) and (3), m1 and m2 each may be 0.001 or greater and smaller than 0.3. The first polymer with m1 and m2 of 0.3 or greater may have poor solubility in a solvent.

The second polymer contains a photo-reactive group or a vertically aligning functional group. The second polymer constitutes the second surface of the alignment film, and the second surface is a surface to be in contact with the liquid crystal layer when the substrate provided with an alignment film of the present invention is applied to a liquid crystal display device. Thus, the aligning functional group of the second polymer significantly contributes to alignment of liquid crystal molecules. The second polymer preferably contains a photo-reactive group or a vertically aligning functional group in a side chain.

The main chain of the second polymer may be derived from a polyamic acid, a polyimide, or a polysiloxane.

The second polymer may have a structure in which the main chain is derived from a polyamic acid represented by the following formula (4):

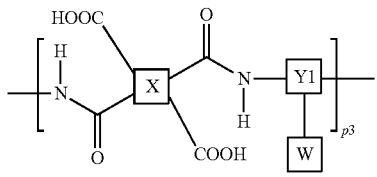

(4)

wherein

X is a structure represented by any of the formulae (X-1) to (X-12);

Y1 is a structure represented by any of the formulae (Y1-1) to (Y1-16);

W is a side chain; and p3 represents the number of repeats, and is an integer of 1 or greater.

The second polymer may have a structure in which the main chain is derived from a polyimide represented by the following formula (5):

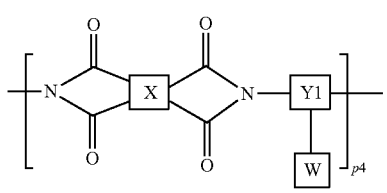

(5)

wherein

X is a structure represented by any of the formulae (X-1) to (X-12);

Y1 is a structure represented by any of the formulae (Y1-1) to (Y1-16);

W is a side chain; and p4 represents the number of repeats, and is an integer of 1 or greater.

The second polymer may have a structure in which the main chain is derived from a polysiloxane represented by the following formula (6):

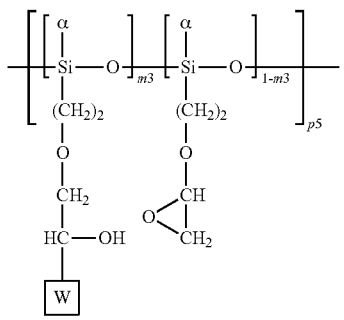

(6)

wherein

α is —H, —OH, a methoxy group, or an ethoxy group;

W is a side chain;

m3 is a real number greater than 0 and smaller than 1; and p5 represents the number of repeats, and is an integer of 1 or greater.

In the formula (6), m3 may be 0.01 or greater and 0.5 or smaller.

The photo-reactive group or the vertically aligning functional group is preferably introduced into side chains W in the formulae (4) to (6). One species of a photo-reactive group or a vertically aligning functional group may be introduced into side chains W, or two or more species thereof may be introduced thereinto. As mentioned above, the presence of a photo-alignment film as the alignment film can more effectively reduce a decrease in VHR and occurrence of image sticking. Thus, the second polymer preferably contains a photo-reactive group. In the case of applying the substrate provided with an alignment film of the present invention to a vertical electric field mode liquid crystal display device, the second polymer preferably contains a vertically aligning functional group, more preferably a vertically photo-aligning functional group.

Examples of a vertically aligning functional group containing no photo-reactive moiety in the second polymer include the structures represented by any of the formulae (W-2-1) to (W-2-7).

The vertically aligning functional group in the second polymer may contain an alkyl group or a cholesterol group. The vertically aligning functional group containing an alkyl group preferably contains a phenyl group or a pyridine skeleton, more preferably a phenyl group or a pyridine skeleton and an ester bond. Examples of the vertically aligning functional group containing an alkyl group include the structures represented by the formulae (W-2-5) to (W-2-7). Examples of the vertically aligning functional group containing a cholesterol group include the structures represented by the formulae (W-2-1) to (W-2-4).

Examples of a vertically aligning functional group containing a photo-reactive moiety in the second polymer include structures represented by any of the formulae (W-4-1) to (W-4-24). Examples of a horizontally aligning functional group containing a photo-reactive moiety include structures represented by the any of the formulae (W-3-1) to (W-3-3).

The photo-reactive group in the second polymer may contain a cinnamate group, a chalcone group, an azobenzene group, or a coumarin group. Examples of a photo-reactive group containing a cinnamate group include the structures represented by the formulae (W-3-1) to (W-3-3) and (W-4-1) to (W-4-21). Examples of a photo-reactive group containing a chalcone group include the structures represented by the formulae (W-3-4) and (W-4-22). Examples of a photo-reactive group containing an azobenzene group include the structures represented by the formulae (W-3-5) and (W-4-23). Examples of a photo-reactive group containing a coumarin group include the structures represented by the formulae (W-3-6) and (W-4-24).

The first polymer has a weight that is equal to or greater than the weight of the second polymer in the alignment film. With the first polymer having a smaller weight than the second polymer, a small amount of the polysiloxane structure is distributed on the first surface of the alignment film and the electrode surface cannot be sufficiently covered with the polysiloxane structure. This causes a failure in sufficiently reducing injection of carriers from the electrode into the alignment film. The first polymer and the second polymer may give a weight ratio of 1:1 to 9:1 in the alignment film.

The alignment film is in contact with the electrode on the substrate surface. Thereby, the first surface of the alignment film is in contact with the electrode. Thus, the polysiloxane structure introduced into a side chain of the first polymer constituting the first surface covers the electrode surface, preventing injection of carriers from the alignment film into the electrode.

Examples of the substrate including an electrode on the surface thereof include an array substrate and a color filter substrate to be used for liquid crystal display devices, and an array-on-color-filter substrate which is a stack of an array substrate and a color filter substrate.

The array substrate may be one usually used in the field of liquid crystal display devices. The array substrate has, in a plan view thereof, a structure including, on a transparent substrate, components such as parallel gate signal lines; parallel source signal lines that extend in the direction perpendicular to the gate signal lines; active elements such as thin-film transistors (TFTs) disposed at the respective intersections of the gate signal lines and the source signal lines; and electrodes disposed in the respective regions (pixels) defined by the gate signal lines and the source signal lines in a matrix form.

Examples of the transparent substrate include glass such as float glass and soda-lime glass; and plastics such as polyethylene terephthalate, polybutylene terephthalate, polyethersulfone, polycarbonate, and alicyclic polyolefin.

The electrode is preferably an electrode to which voltages with different polarities are applied periodically. The electrode may be a pixel electrode provided for each pixel, for example.

The electrode is preferably formed from a transparent conductive material. Examples of the transparent conductive material include indium tin oxide (ITO) and indium zinc oxide (IZO).

The electrode may be provided with a slit. In liquid crystal display devices, the alignment film may be subjected to alignment division in order to give different alignment azimuths of liquid crystal molecules to the respective regions. The alignment division may be performed by applying linearly polarized ultraviolet light to the photo-alignment film in different azimuths. The alignment of liquid crystal molecules may be unstable and the transmissivity may be reduced at an interface between regions having different alignment azimuths of liquid crystal molecules. Such an interface may appear as a dark line. The presence of a slit in the electrode can stabilize the alignment of liquid crystal molecules, reduce occurrence of dark lines, and improve the transmissivity of the display region of the liquid crystal display device. In contrast, the presence of a slit in the electrode may cause distortion in lines of electric force generated between the pixel electrode and the counter electrode and a partially high electric flux density of the DC offset voltage. This increases the residual DC voltage. Since the polysiloxane structure is introduced into a side chain of the first polymer constituting the first surface of the alignment film, the substrate provided with an alignment film of the present invention can prevent injection of carriers from the electrode into the alignment film. This enables sufficient reduction in a decrease in VHR and occurrence of image sticking even when the presence of a slit in the electrode causes distortion of lines of electric force.

The slit may have any shape, such as a linear opening. A plurality of slits may be provided. The slit may have a width of 1.0 to 10.0 µm, for example.

The substrate provided with an alignment film of the present invention can suitably be used as an array substrate of a liquid crystal display device. The liquid crystal display device including the substrate provided with an alignment film of the present invention may be of any alignment mode. In order to reduce a decrease in VHR and occurrence of image sticking more effectively with the use of a photo-alignment film, the substrate provided with an alignment film can suitably be used as a vertical electric field mode liquid crystal display device requiring precise control of pre-tilt angle. Examples of the vertical electric field mode liquid crystal display device include liquid crystal display devices of a vertical alignment electrically controlled birefringence (ECB) mode in which liquid crystal molecules are aligned substantially vertically to the alignment film when no voltage applied and the liquid crystal molecules are tilted to provide display when voltage is applied; those of a vertical alignment twisted nematic (TN) mode in which the alignment azimuth of liquid crystal molecules is twisted to provide display when voltage is applied; and those of a multi-domain vertical alignment (MVA) mode in which one substrate is provided with a rib. In particular, the present invention can suitably be applied to a vertical electric field mode liquid crystal display device including a photo-alignment film and at least one selected from a pixel electrode and a counter electrode is provided with an opening (slit).

Liquid Crystal Display Device

Embodiment 1

Another aspect of the present invention relates to a liquid crystal display device including, in the given order: an array substrate including a pixel electrode; an alignment film in contact with the pixel electrode; a liquid crystal layer containing a liquid crystal molecule, and a counter substrate including a counter electrode, the array substrate and the alignment film constituting a stack, the stack being the substrate provided with an alignment film of the present invention.

Figure 2:
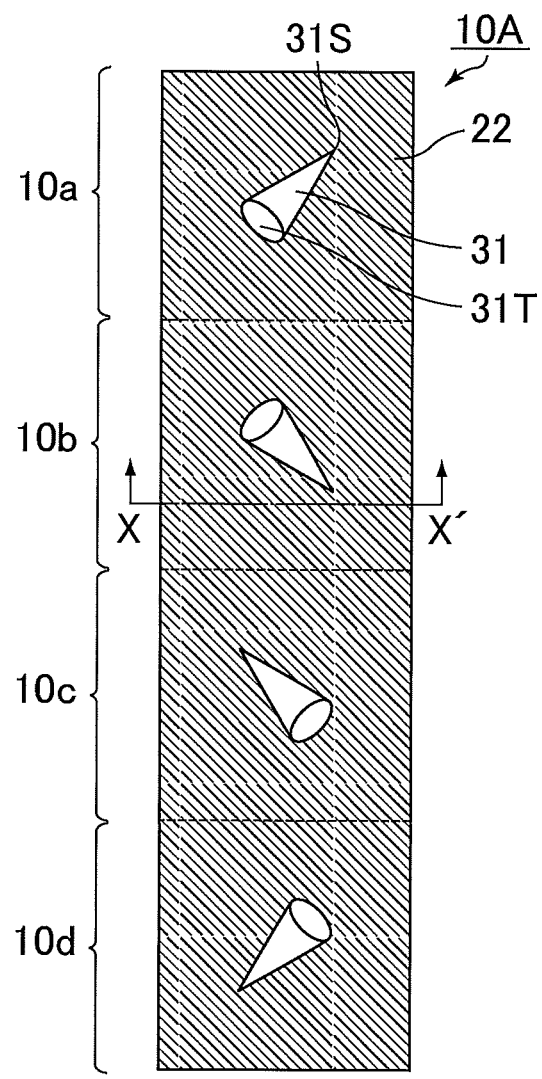
FIG. 2 is a schematic plan view of an example of the liquid crystal display device of Embodiment 1.

The following describes a liquid crystal display device 100A of Embodiment 1 referring to FIGS. 1 and 2. The liquid crystal display device 100A is a liquid crystal display device of a display mode in which a vertical electric field is generated between the pixel electrode provided on the array substrate and the counter electrode provided on the counter substrate when voltage is applied. Embodiment 1 relates to this display mode. Still, the display mode of the liquid crystal display device of the present invention is not limited to such a display mode.

Figure 3:
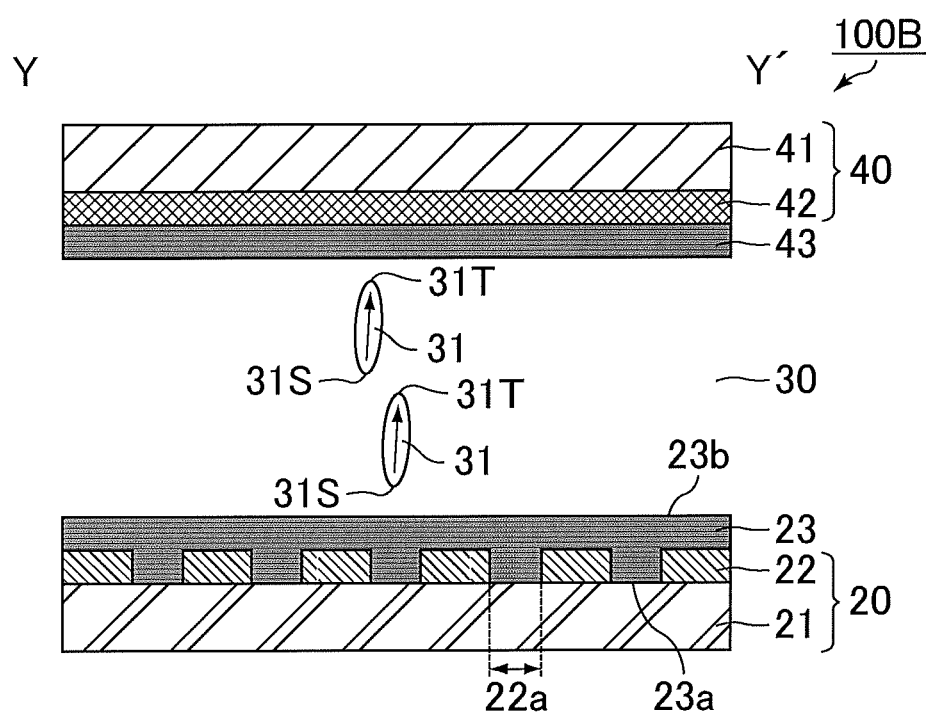
FIG. 3 is a schematic cross-sectional view of an example of a liquid crystal display device of Embodiment 2.
Figure 4:
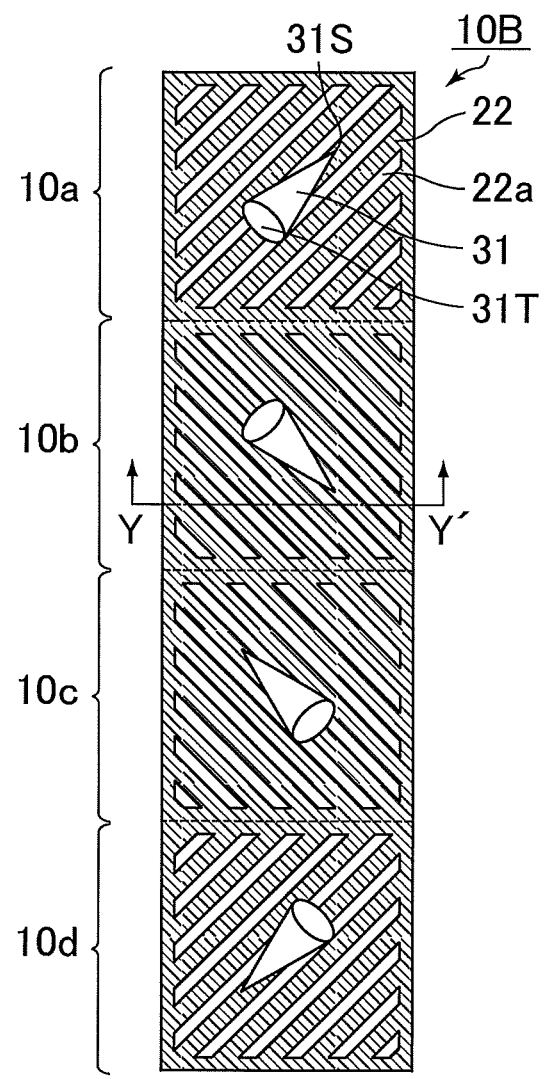
FIG. 4 is a schematic plan view of an example of the liquid crystal display device of Embodiment 2.

FIG. 1 is a schematic cross-sectional view of an example of a liquid crystal display device of Embodiment 1. FIG. 2 is a schematic plan view of an example of the liquid crystal display device of Embodiment 1. FIG. 2 is a schematic plan view of a pixel in a no voltage application state in which no voltage is applied between the pixel electrode and the counter electrode. FIG. 1 is a schematic cross-sectional view taken along the X-X' line in FIG. 2. In FIG. 1 and FIG. 3 to be mentioned later, the end of the major axis of each liquid crystal molecule 31 on the array substrate 20 side is defined as an initial point (hereinafter, also referred to as a "tail of the liquid crystal director") 31S and the end of the major axis thereof on the counter substrate 40 side is defined as a final point (hereinafter, also referred to as a "head of the liquid crystal director") 31T. In FIG. 2 and FIG. 4 to be mentioned later, each liquid crystal molecule 31 is illustrated as a pin (cone). The bottom of the cone represents the counter substrate 40 side (viewer side) and the apex of the cone represents the array substrate 20 side.

As illustrated in FIG. 1, the liquid crystal display device 100A of Embodiment 1 includes, in the stated order: an array substrate 20 including a pixel electrode 22 on a first transparent substrate 21; a first alignment film 23; a liquid crystal layer 30 containing liquid crystal molecules 31; a second alignment film 43; and a counter substrate 40 including a counter electrode 42 on a second transparent substrate 41. The liquid crystal layer 30 is surrounded by a sealant (not illustrated). The array substrate 20 and the counter substrate 40 each may be provided with a polarizer (linear polarizer) on the side opposite to the liquid crystal layer 30. These components constitute a liquid crystal panel. Although not illustrated, the liquid crystal display device 100A includes a backlight on the back of the array substrate 20.

The stack of the array substrate and the alignment film is the aforementioned substrate provided with an alignment film of the present invention. In other words, in the substrate provided with an alignment film of the present invention, the electrode provided on the substrate surface corresponds to the pixel electrode 22 and the alignment film in contact with the electrode corresponds to the first alignment film 23.

The liquid crystal layer 30 may be any layer that contains at least one liquid crystal material. The liquid crystal material may be one usually used in the field of liquid crystal display devices. The liquid crystal material is preferably a liquid crystal material (negative liquid crystal material) having negative anisotropy of dielectric constant ($\Delta\varepsilon$) defined by the following formula:

$$\Delta\varepsilon=\text{(dielectric constant of liquid crystal molecule in major axis direction)}-\text{(dielectric constant of liquid crystal molecule in minor axis direction)}.$$

The counter substrate 40 may be a color filter substrate. The color filter substrate may be one usually used in the field of liquid crystal display devices, such as a structure in which a grid-like black matrix is provided on a transparent substrate, a color filter is provided for each space in the grid, i.e., for each pixel, and the counter electrode 42 is provided thereon.

In Embodiment 1, the pixel electrode 22 and the counter electrode 42 both may be planar electrodes without an opening (slit). For the pixel electrode 22 and the counter electrode 42 which are planar electrodes without an opening, the lines of electric force generated between the pixel electrode 22 and the counter electrode 42 are uniform in one pixel. Thus, the DC offset voltage can be set to 0 by adjusting the voltage applied to the counter electrode 42.

In the liquid crystal display device 100A, light is incident on the liquid crystal panel from the backlight. The amount of light passing through the liquid crystal panel can be controlled by switching the alignment of the liquid crystal molecules 31 in the liquid crystal layer 30. Switching of the alignment of the liquid crystal molecules 31 is performed by applying voltage to the liquid crystal layer 30 by the use of the pixel electrode 22 and the counter electrode 42. When voltage is applied, a vertical electric field is generated between the pixel electrode 22 and the counter electrode 42. When the voltage applied to the liquid crystal layer 30 is lower than the threshold value (in a no voltage application state), the first alignment film 23 and the second alignment film 43 control the initial alignment of the liquid crystal molecules 31.

The first alignment film 23 and the second alignment film 43 are preferably vertical alignment films. In the liquid crystal display device 100A, the liquid crystal molecules 31 are substantially vertically aligned relative to the array substrate 20 and the counter substrate 40 in a no voltage application state. The term "substantially vertically" as used herein means that the photo-alignment treatment provided on the first alignment film 23 and the second alignment film 43 leads to slightly tilted alignment of the liquid crystal molecules 31 relative to the array substrate 20 and the counter substrate 40. The pre-tilt angle of the liquid crystal molecules 31 relative to the array substrate 20 and the counter substrate 40 in a no voltage application state is preferably not smaller than 85° but smaller than 90°. The pre-tilt angle of the liquid crystal molecules 31 is more preferably 87.5° to 88.0°. When voltage is applied between the pixel electrode 22 and the counter electrode 42, a vertical electric field is generated in the liquid crystal layer 30 and the liquid crystal molecules 31 are more greatly tilted while maintaining the tilting azimuth in a no voltage application state. The liquid crystal molecules 31 are substantially vertically aligned (aligned in a slightly tilted state) in a no voltage application state and, in a voltage application state, greatly tilted while maintaining the tilting azimuth in a no voltage application state. Thus, the initial point 31S and the final point 31T of the alignment vector can be checked while voltage is applied to the liquid crystal layer 30.

As illustrated in FIG. 2, in the liquid crystal display device 100A, one pixel 10A is divided into four alignment regions, i.e., a first domain 10a, a second domain 10b, a third domain 10c, and a fourth domain 10d. In order to achieve good viewing angle characteristics, the alignment vector of the first domain 10a, the alignment vector of the second domain 10b, the alignment vector of the third domain 10c, and the alignment vector of the fourth domain 10d are preferably directed to directions different by 90° each. Such four domains in one direction and alignment vectors of the domains different by 90° each in one pixel enable reduction in size of one pixel, reduction in occurrence of dark lines to improve the transmissivity, and improvement in viewing angle characteristics. In the present description, the azimuth from the initial point 31S to the final point 31T of a liquid crystal molecule 31 is defined as the alignment vector. The alignment vector is the same direction as the tilting azimuth of the liquid crystal molecules 31 relative to the first alignment film 23 on the array substrate 20 side and the opposite direction to the tilting azimuth of the liquid crystal molecules 31 relative to the second alignment film 43 on the counter substrate 40 side. The term "azimuth" as used herein means the orientation projected on the substrate surface. The tilt angle (polar angle, pre-tilt angle) from the normal direction of the substrate surface is not considered herein.

In one example, for the alignment vector of the first domain 10a and the alignment vector of the second domain 10b, the final points face each other and are perpendicular to each other (form an angle of substantially 90°); for the alignment vector of the second domain 10b and the alignment vector of the third domain 10c, the initial points face each other and are parallel to each other (form an angle of about 180°); and for the alignment vector of the third domain 10c and the alignment vector of the fourth domain 10d, the final points face each other and are perpendicular to each other (form an angle of substantially 90°).

The phrase "perpendicular to each other (form an angle of substantially 90°)" as used herein specifically means that the angle formed is 75° to 105°, preferably 80° to 100°, more preferably 85° to 95°. The phrase "parallel to each other (form an angle of about 180°)" as used herein at least means that the alignment vectors are substantially parallel to each other within the range that gives the effects of the invention, specifically the angle formed is −15° to +15°, preferably −10° to +10°, more preferably −5° to +5°.

In each of the first to fourth domains 10a, 10b, 10c, and 10d, the first alignment film 23 and the second alignment film 43 have been preferably subjected to alignment treatment such that the twist angle of the liquid crystal molecules 31 in a no voltage application state is 45° or smaller. The twist angle is more preferably substantially 0°. The term "substantially 0°" means the range of 0°±10°. The twist angle means the angle formed by the tilting azimuth of the liquid crystal molecules 31 relative to the first alignment film 23 and the tilting azimuth of the liquid crystal molecules 41 relative to the second alignment film 43.

The first alignment film 23 includes a first surface 23a provided on the side close to the pixel electrode 22 and containing the first polymer and a second surface 23b provided on the side opposite to the first surface and containing the second polymer. The first alignment film 23 is in contact with the pixel electrode 22, and the first surface on the side close to the pixel electrode 22 contains the first polymer containing a polysiloxane structure in a side chain. This can prevent injection of carriers from the pixel electrode 22 into the first alignment film 23, reducing a decrease in VHR and occurrence of image sticking.

The pixel electrode 22 and the polysiloxane structure contained in the first alignment film 23 may be in contact with each other. Such contact between the pixel electrode 22 and the polysiloxane structure can more surely reduce injection of carriers from the electrode into the alignment film.

The polysiloxane structure may be a silsesquioxane group. The silsesquioxane group may be a structure represented by the formula (1). The group may be a structure containing an amide group between the main chain of the first polymer and the silsesquioxane group, as represented by the formula (1-1).

In the liquid crystal display device 100A, the first alignment film 23 is preferably a vertical alignment film. Thus, in Embodiment 1, the second polymer preferably contains a vertically aligning functional group, more preferably a vertically photo-aligning functional group in a side chain (e.g., side chains W in the formulae (4) to (6)). In contrast, even when the first alignment film 23 is a vertical alignment film, the first polymer has only to contain a polysiloxane structure in a side chain, and the other side chains (e.g., side chains W in the formula (2) or (3)) may be of any type.

Figure 6:
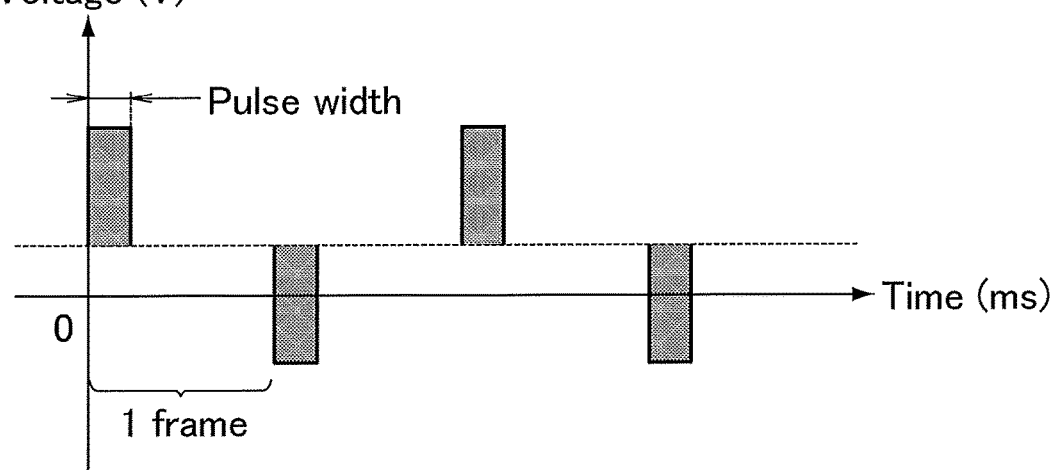
FIG. 6 is a schematic diagram of a change in voltage applied to one pixel from a pixel electrode and a counter electrode.

The polymer contained in the second alignment film 43 may be of any type. For example, the first polymer and the second polymer may be contained similarly to the first alignment film 23, or a polymer different from the first and second polymers may be contained. The second alignment film 43 may contain one species of a polymer. As described with reference to FIG. 6, a constant common voltage is applied to the counter electrode when the liquid crystal display device provides display. Thus, unlike the case of a pixel electrode to which a pulse voltage is applied, no injection of carriers occurs from the counter electrode into the second alignment film 43. Accordingly, unlike the first alignment film 23, the second alignment film 43 needs not to be an alignment film that contains a polymer containing a polysiloxane structure in a side chain.

The second alignment film 43 may contain a polymer containing an aligning functional group. In the liquid crystal display device 100A, the second alignment film 43 is preferably a vertical alignment film. Thus, in Embodiment 1 the polymer contained in the second alignment film 43 preferably contains a vertically aligning functional group, more preferably a vertically photo-aligning functional group, in a side chain. Unlike the pixel electrode, the counter electrode supplies only a constant voltage and no change over time occurs in the voltage applied. Thus, the voltage immediately reaches an equilibrium state between the counter electrode and the second alignment film 43 and no oxidation-reduction reaction occurs due to an electric charge interaction. Accordingly, ionization of photo-reactive groups, for example, does not occur even when the counter electrode and the photo-reactive group are in contact with each other.

The main chain of the polymer contained in the second alignment film 43 may be derived from a polyamic acid, a polyimide, or a polysiloxane.

The liquid crystal display device 100A may further include a polymer layer on a surface of each of the first alignment film 23 and the second alignment film 43. The polymer layer is a layer for controlling the alignment of liquid crystal molecules, and is also referred to as an alignment maintaining layer (polymer sustained alignment (PSA) layer). The polymer layer may be produced, for example, by preparing a liquid crystal composition by mixing a liquid crystal material with polymerizable components such as monomers or oligomers, sealing the liquid crystal composition between the array substrate and the counter substrate, and polymerizing the components such as the monomers by heat or light (e.g., ultraviolet light) application.

Examples of the monomer for forming the polymer layer may be any of the compounds represented by the following formulae (7-1) to (7-5).

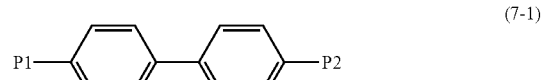

(7-1)

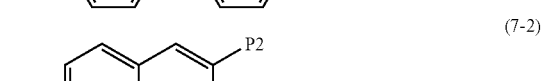

(7-2)

(7-3)

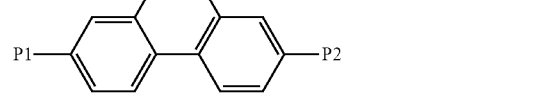

(7-4)

(7-5)

The polarizer may be one usually used in the field of liquid crystal display devices. An optical film such as a retardation layer may be provided between the polarizer and each of the array substrate 20 and the counter substrate 40.

The backlight may be one usually used in the field of liquid crystal display devices. The backlight may be any backlight that emits light including visible light, and may be one that emits light including only visible light or emits light including both visible light and ultraviolet light. In order to enable the liquid crystal display device to provide color display, the backlight suitably used is one emitting white light. The light source of the backlight may suitably be a light emitting diode (LED), for example. The "visible light" as used herein refers to light (electromagnetic waves) having a wavelength of 380 nm or longer and shorter than 800 nm.

The liquid crystal display device of the present embodiment has a structure including, as well as the liquid crystal panel and the backlight, components such as external circuits, including a tape-carrier package (TCP) and a printed circuit board (PCB); optical films, including a viewing angle-increasing film and a luminance-increasing film; and a bezel (frame). Some components may be incorporated into another component. In addition to the components described above, the liquid crystal display device may include any components that are usually used in the field of liquid crystal display devices. The detailed description for each of these additional components is therefore not provided herein.

Embodiment 2

Figure 5:
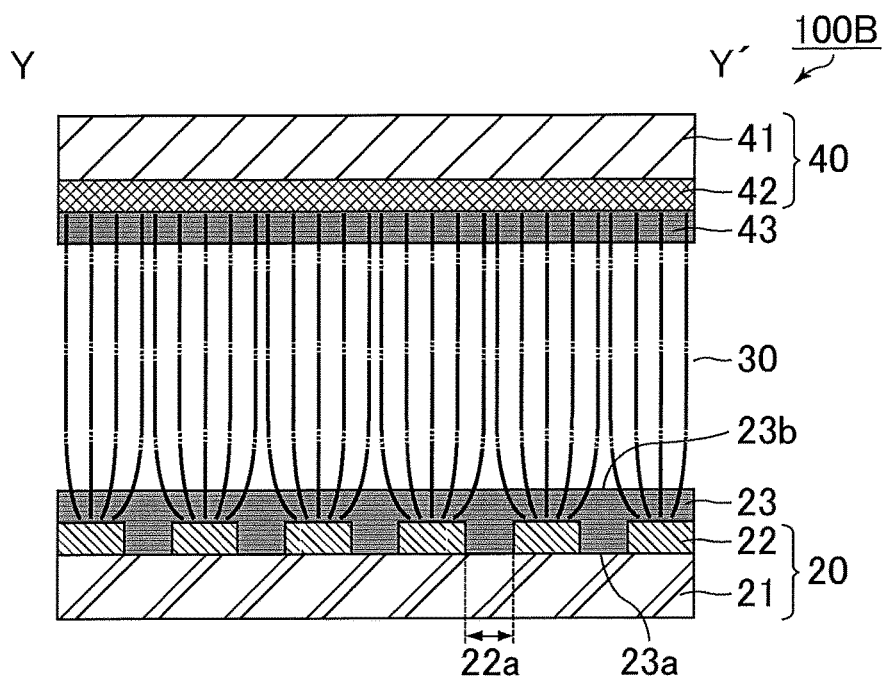
FIG. 5 is a schematic cross-sectional view of the liquid crystal display device of Embodiment 2, showing lines of electric force in voltage application.

The following describes a liquid crystal display device 100B of Embodiment 2 referring to FIGS. 3 to 5. FIG. 3 is a schematic cross-sectional view of an example of a liquid crystal display device of Embodiment 2. FIG. 4 is a schematic plan view of an example of the liquid crystal display device of Embodiment 2. As illustrated in FIGS. 3 to 5, in Embodiment 2, the pixel electrode 22 is provided with slits 22a. The liquid crystal display device 100B has the same structure as the liquid crystal display device 100A of Embodiment 1, except that the pixel electrode 22 is provided with the slits 22a. The descriptions of the same features are therefore omitted here.

As illustrated in FIG. 4, in the liquid crystal display device 100B, one pixel 10B is divided into four alignment regions, i.e., the first domain 10a, the second domain 10b, the third domain 10c, and the fourth domain 10d. The alignment of liquid crystal molecules may be unstable and the transmissivity may be reduced at an interface between domains. Such an interface may appear as a dark line. The presence of the slits 22a in the pixel electrode 22 in the liquid crystal display device 100B can stabilize the alignment of the liquid crystal molecules 31, reduce occurrence of dark lines, and improve the transmissivity of the display region of the liquid crystal display device.

FIG. 5 is a schematic cross-sectional view of the liquid crystal display device of Embodiment 2, showing lines of electric force in voltage application. In FIG. 5, the lines of electric force are illustrated by dashed double-dotted lines. As illustrated in FIG. 5, in the liquid crystal display device 100B including the pixel electrode 22 provided with the slits 22a, the lines of electric force generated between the pixel electrode and the counter electrode are distorted and the electric flux density becomes partially high at the pixel electrode portion. Thus, the DC offset voltage applied in one pixel partially varies. Even when the voltage applied to the counter electrode 42 is controlled, the lines of electric force cannot be uniform. Thus, the DC offset voltage is never adjusted to 0. In Embodiment 2, a polysiloxane structure is introduced into a side chain of the first polymer constituting the first surface 23a of the first alignment film 23, which can prevent injection of carriers from the pixel electrode 22 into the first alignment film 23. This can more effectively reduce a decrease in VHR and occurrence of image sticking in the liquid crystal display device including the electrode provided with the slits.

In Embodiment 2, the presence of the slits in the electrode can prevent distortion in lines of electric force and an influence of such distortion on the DC offset voltage. Thus, the slits may be provided for either the pixel electrode 22 or the counter electrode 42. In the liquid crystal display device 100B described as an example, the slits are provided for the pixel electrode 22 and no slits are provided for the counter electrode 42. Still, any electrode may be provided with slits, and one or both of the pixel electrode 22 and the counter electrode 42 may be provided with slits.

Even when the counter electrode 42 is provided with slits and the pixel electrode 22 is not provided with slits, the presence of a polysiloxane structure introduced into a side chain of the first polymer constituting the first surface of the first alignment film 23 can prevent injection of carriers from the pixel electrode 22 into the first alignment film 23, sufficiently reducing a decrease in VHR and occurrence of image sticking.

In order to further stabilize the alignment of the liquid crystal molecules 31, the pixel electrode 22 is preferably provided with the slits 22a.

A plurality of the slits 22a is preferably provided in parallel to the alignment vectors of the first, second, third, and fourth domains 10a, 10b, 10c, and 10d. The presence of the slits enables formation of a transverse electric field that is parallel to the array substrate surface and perpendicular to the extending direction of the slit portions. This transverse electric field can change the alignment directions of the liquid crystal molecules 31 to align the liquid crystal molecules 31 in directions parallel to the slit portions.

Some embodiments of the present invention have been described above. All the features in the embodiments are applicable to the whole aspects of the present invention.

The present invention is described in detail below based on examples and comparative examples. The examples, however, are not intended to limit the scope of the present invention.

Example 1-1

(Synthesis of Silsesquioxane-Containing Diamine)

The following describes an exemplary synthesis of silsesquioxane-containing diamine. First, as shown in the following reaction scheme (A), 3 g (13.3 mmol) of dinitrophenylacetic acid represented by the following formula (8) was dissolved in 20 mL of benzene. Thionyl chloride (SOCl$_2$) was dropwise added thereto, whereby dinitrophenylacetyl chloride (12.1 mmol, yield: 91%) represented by the following formula (9) was synthesized. In the reaction schemes (A) to (C), the symbol "M.W." beside each formula number means the weight average molecular weight.

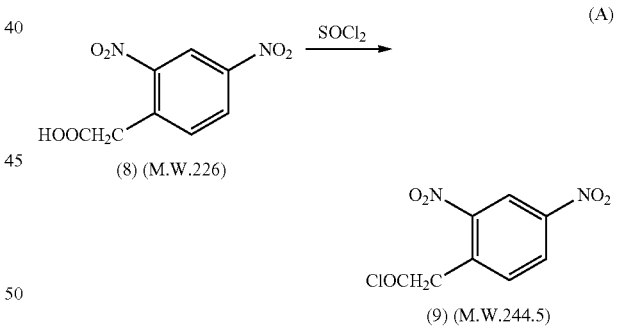

Next, as shown in the following reaction scheme (B), a benzene solution (10 mL) containing 2.9 g (12 mmol) of dinitrophenylacetyl chloride (formula (9)) obtained in the reaction scheme (A) was dropwise added to a benzene solution (50 mL) containing 13 g (14 mmol) of heptaisobutyl-substituted PSS-[3-(2-aminoethyl)amino]propyl represented by the following formula (10) and 1.5 g (15 mmol) of triethylamine (N(Et)$_3$) at room temperature in a nitrogen atmosphere. Then, the components were reacted for five hours at room temperature. As the reaction was completed, impurities were extracted with water and the residue was purified by column chromatography using a solution mixture of toluene and ethyl acetate at 4:1, whereby 10.0 g (yield: 74%) of a compound represented by the following formula (11) was obtained.

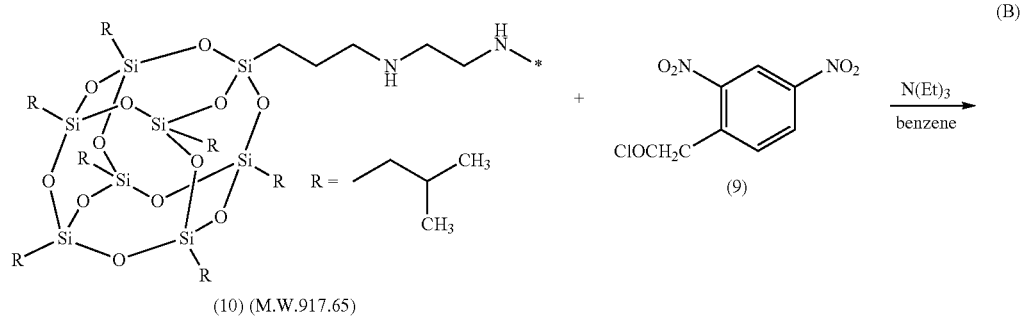

(10) (M.W.917.65)     (9)     (B)

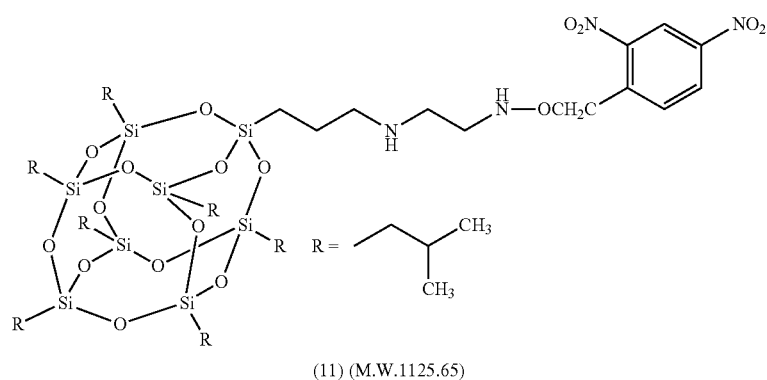

(11) (M.W.1125.65)

Subsequently, as shown in the following reaction scheme (C), 9 g of the compound represented by the formula (11) obtained in the reaction scheme (B) was dissolved in 20 mL of Solmix AP-1 (Japan Alcohol Trading Co., Ltd.). Then, 0.5 g of a Raney nickel (Ni) catalyst was added thereto, and the mixture was left in an autoclave. The system was purged with hydrogen ($H_2$), and left overnight at room temperature and a pressure of 0.4 MPa. High performance liquid chromatography (HPLC) was performed to confirm termination of the reaction, and the reaction solution was filtered through Celite. The filtrate was concentrated until no distillate was observed. The resulting crude liquid was distilled under reduced pressure, whereby 6.13 g (yield: 72%) of a silsesquioxane-containing diamine represented by the following formula (12) was obtained.

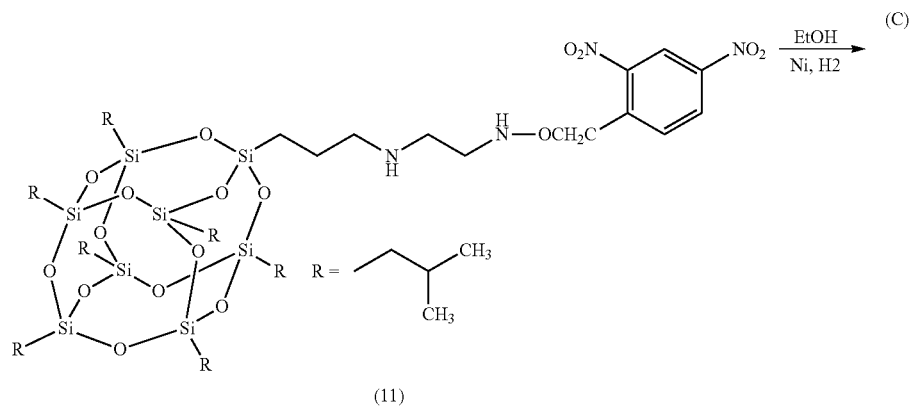

(11)     (C)

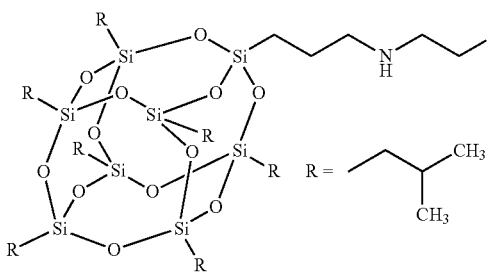
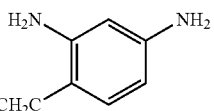

(12) (M.W.1065.65)

(Synthesis of First Polymer)

A γ-butyrolactone solution containing 0.005 mol of the silsesquioxane-containing diamine represented by the formula (12) synthesized above and 0.095 mol of a diamine represented by the following formula (13) was mixed with 0.10 mol of an acid anhydride represented by the following formula (14), and the components were reacted for 12 hours at 60° C.

(13)

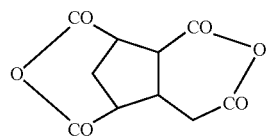

(14)

Thereby, a first polymer A1-1 containing a polyamic acid having a random structure represented by the following formula (2) was synthesized. For the first polymer A1-1, m1 in the following formula (2) was 0.001.

In the formula, X is a structure represented by the following formula (X-5); Y1 is a structure represented by the following formula (Y1-1) or (Y1-2); Y2 is a structure represented by the following formula (Y2-1); W is a hydrogen atom; and p1 represents the number of repeats, and is an integer of 1 or greater.

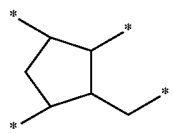

(X-5)

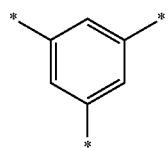

(Y1-1)

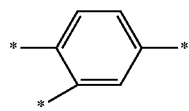

(Y1-2)

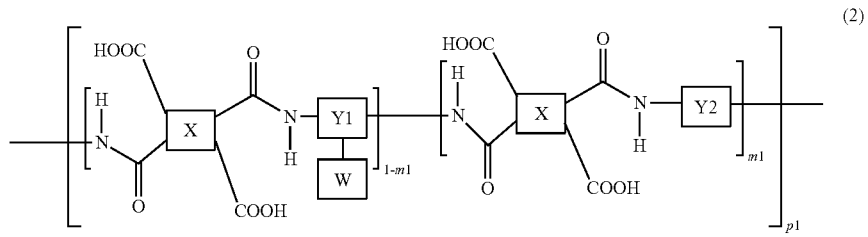

(2)

-continued (Y2-1)

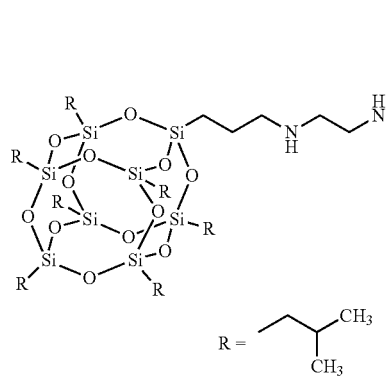

In the formula, R is the structure represented by the formula (1-a).

(Synthesis of Second Polymer)

A γ-butyrolactone solution of 0.1 mol of a cinnamate group-containing diamine represented by the following formula (15) was mixed with 0.10 mol of the acid anhydride represented by the formula (14), and the components were reacted for 12 hours at 60° C.

Thereby, a second polymer B1 containing a polyamic acid having a random structure represented by the following formula (4) was synthesized.

(4)

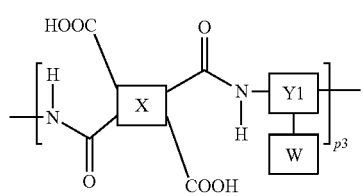

In the formula, X is the structure represented by the formula (X-5); Y1 is the structure represented by the formula (Y1-1); W is a structure represented by the following formula (W-4-3); and p3 represents the number of repeats, and is an integer of 1 or greater.

(W-4-3)

[chemical structure]

(Preparation of Liquid Crystal Alignment Agent)

The first polymer A1-1 and the second polymer B1 at a weight ratio of 4:1 were mixed with a solution mixture of N-methyl-2-pyrrolidone (NMP) and γ-butyrolactone, whereby a liquid crystal alignment agent was prepared.

(Production of Liquid Crystal Cell)

An array substrate including as a pixel electrode an indium tin oxide (ITO) electrode provided with opening portions (slits) and a counter substrate including as a counter electrode a planar ITO electrode (solid electrode) provided with no opening portions were prepared. The liquid crystal alignment agent was applied to a surface of each substrate, and pre-baked at 90° C. for five minutes, then post-baked at 200° C. for 40 minutes. The surfaces of the substrates were (15)

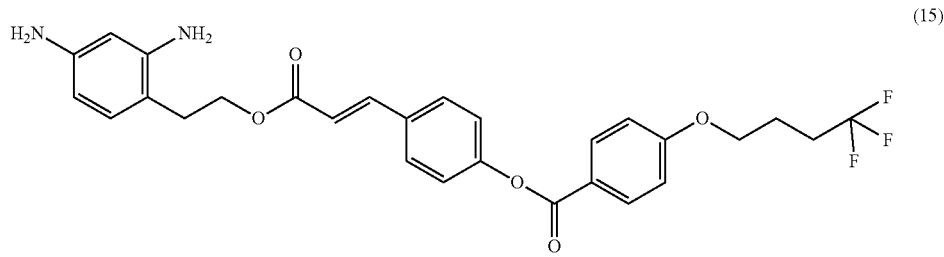

then irradiated with 20 mJ/cm² of linearly polarized ultraviolet light having a central wavelength of 330 nm, i.e. subjected to a photo-alignment treatment so as to give a pre-tilt angle of 87.5°. Thereby, an array substrate and a counter substrate were produced each including a double-layered vertical alignment film containing a photo-reactive group. The surface of each alignment film on the electrode side is the first surface and the surface on the side opposite to the first surface is the second surface.

An ultraviolet-curable sealant was applied in a predetermined pattern to one of the substrates using a dispenser, while a negative liquid crystal material was dropped to a predetermined position on the other substrate. The liquid crystal material used had a nematic-isotropic liquid phase transition temperature (Tni) of 90° C., an anisotropy of dielectric constant (Δε) of −3.0, and a refractive index anisotropy (Δn) of 0.09. The substrates were then attached to each other in vacuo, and the sealant was cured by ultraviolet light. The workpiece was heated at 130° C. for 40 minutes and subjected to re-alignment treatment, so that the liquid crystal molecules in the liquid crystal layer were converted into an isotropic phase. The workpiece was then cooled down to room temperature, whereby a liquid crystal cell of Example 1-1 was produced. Example 1-1 provides a specific example of the liquid crystal display device 100B.

Examples 1-2 to 1-4 and Comparative Example 1

(Preparation of Liquid Crystal Alignment Agent)

A first polymer A1-2 wherein m1 in the formula (2) is 0.01, a first polymer A1-3 wherein m1 is 0.1, and a first polymer A1-4 wherein m1 is 0.2 were synthesized in the same manner as in the first polymer A1-1, except that the weight ratio of the diamine represented by the formula (13) and the silsesquioxane-containing diamine represented by the formula (12) was changed in the synthesis of the first polymer.

In the synthesis of the first polymer, 0.10 mol of the acid anhydride represented by the formula (14) was added to a γ-butyrolactone solution containing 0.1 mol of the diamine represented by the formula (13) without addition of the silsesquioxane-containing diamine represented by the formula (12). The components were then reacted at 60° C. for 12 hours, whereby a first polymer A1-5 was synthesized, wherein m1 in the formula (2) was 0.

One of the first polymers A1-2 to A-5 and the second polymer B1 at a weight ratio of 4:1 were mixed with a solution mixture of NMP and γ-butyrolactone, whereby a liquid crystal alignment agent was prepared.

(Production of Liquid Crystal Cell)

An array substrate including an ITO electrode provided with opening portions and a counter substrate including an ITO electrode provided with no opening portions were prepared. The liquid crystal alignment agent obtained above was applied to a surface of each substrate, and then pre-baked, post-baked, and subjected to photo-alignment treatment as in Example 1-1. Thereby, an array substrate and a counter substrate were produced each including a double-layered vertical alignment film containing a photo-reactive group. Subsequently, as in Example 1-1, the liquid crystal material was dropped and the substrates were attached to each other, whereby a liquid crystal cell of each of Examples 1-2 to 1-4 and Comparative Example 1 was produced. Examples 1-2 to 1-4 and Comparative Example 1 respectively provide specific examples of the liquid crystal display device 100B.

Example 1-5

(Production of Liquid Crystal Cell)

An array substrate including as a pixel electrode an ITO electrode provided with no opening portions and a counter substrate including as a counter electrode an ITO electrode provided with no opening portions were prepared. A liquid crystal alignment agent containing the first polymer A1-3 and the second polymer B1 at a weight ratio of 4:1 was applied to a surface of each substrate, and then pre-baked, post-baked, and subjected to photo-alignment treatment as in Example 1-1. Thereby, an array substrate and a counter substrate were produced each including a double-layered vertical alignment film containing a photo-reactive group. Subsequently, as in Example 1-1, the liquid crystal material was dropped and the substrates were attached to each other, whereby a liquid crystal cell of Example 1-5 was produced. Example 1-5 provides a specific example of the liquid crystal display device 100A.

Comparative Example 2

(Production of Liquid Crystal Cell)

A liquid crystal cell of Comparative Example 2 was produced in the same manner as in Example 1-5 except that the liquid crystal alignment agent used was a liquid crystal alignment agent containing the first polymer A1-5 and the second polymer B1 at a weight ratio of 4:1.

<High-Temperature Power-on Test>

In order to evaluate the reliability of the liquid crystal cells of Examples 1-2 to 1-5 and Comparative Examples 1 and 2, the following power-on test was performed. In the power-on test, each liquid crystal cell was placed on a 3000-Cd/m$^2$ backlight, and a voltage of 5 V was applied to the liquid crystal layer for 1000 hours at 70° C. with backlight illumination. Such a power-on test at a high temperature (70° C.) causes a greater influence of carriers injected from the pixel electrode into the alignment film and more rapid progress of, for example, degradation of components due to backlight illumination than at room temperature (25° C.). Thus, the test result was used as an indicator for long-term stability.

For the liquid crystal cells, the voltage holding ratio (VHR), the residual DC voltage (rDC), and the contrast ratio (CR) were determined before the power-on test (initial) and after the power-on test. The VHR was determined at 1 V and 70° C. using a VHR measurement system (Model 6254, Toyo Corp.). The rDC was determined by the flicker minimizing method after a 60-Hz alternate current (AC) voltage of 3 V was applied from the pixel electrode for two hours to cause the DC offset voltage to be 2 V. The CR was determined in an environment at 25° C. using UL-1 (Topcon Corp.). The results of Examples 1-1 to 1-5 and Comparative Examples 1 and 2 are shown in the following Table 1.

TABLE 1

| | First polymer | Second polymer | Weight ratio A:B | Electrode slit | Initial VHR (%) | Initial rDC (mV) | Initial CR | After power-on test VHR (%) | After power-on test rDC (mV) | After power-on test CR |
|---|---|---|---|---|---|---|---|---|---|---|
| Example 1-1 | A1-1 m1 = 0.001 | B1 | 4:1 | Present | 99.4 | 20 | 3000 | 98.8 | 60 | 3000 |
| Example 1-2 | A1-2 m1 = 0.01 | B1 | 4:1 | Present | 99.4 | 10 | 3000 | 99.1 | 20 | 3000 |
| Example 1-3 | A1-3 m1 = 0.1 | B1 | 4:1 | Present | 99.5 | −10 | 3000 | 99.3 | 10 | 3000 |
| Example 1-4 | A1-4 m1 = 0.2 | B1 | 4:1 | Present | 99.5 | −10 | 3000 | 99.3 | 0 | 3000 |
| Example 1-5 | A1-3 m1 = 0.1 | B1 | 4:1 | Absent | 99.5 | −10 | 3000 | 99.3 | 0 | 3000 |
| Comparative Example 1 | A1-5 m1 = 0 | B1 | 4:1 | Present | 99.4 | 20 | 3000 | 98.1 | 160 | 3000 |
| Comparative Example 2 | A1-5 m1 = 0 | B1 | 4:1 | Absent | 99.5 | 20 | 3000 | 98.2 | 90 | 3000 |

Table 1 demonstrates that the VHR was less reduced and the rDC was less increased after the power-on test in each of Examples 1-1 to 1-5 in which the alignment film contained the first polymer containing a polysiloxane structure in a side chain. This is presumably because as follows. That is, the presence of the first polymer containing a polysiloxane structure (specifically, a silsesquioxane group) in the alignment film enabled distribution of the polysiloxane structure on the surface of the pixel electrode, reducing injection of carriers from the pixel electrode into the alignment film.

In Comparative Example 1 in which the alignment film contained the first polymer containing no polysiloxane structure, however, the VHR was reduced and the rDC was significantly increased after the power-on test. This is presumably because as follows. That is, in Comparative Example 1, the absence of the polysiloxane structure on the surface of the pixel electrode caused injection of carriers from the pixel electrode into the alignment film during the power-on test and changed the resistance of the alignment film, increasing the rDC. As the resistance of the alignment film was reduced, a greater amount of DC offset components were applied to the liquid crystal layer, whereby the rDC showed an increasing tendency. Further, such a reduction in resistance of the alignment film may presumably result in a decreasing tendency of the VHR.

Example 1-5 and Comparative Example 2 are examined in each of which the entirely solid pixel electrode was used. In Comparative Example 2, the alignment film contained the first polymer containing no polysiloxane structure. This presumably caused injection of carriers from the pixel electrode into the alignment film, reducing the resistance of the alignment film and reducing the VHR. In Example 1-5, the VHR was less reduced and the rDC was less increased after the power-on test. This demonstrates that the presence of the first polymer containing a polysiloxane structure in the alignment film reduced injection of carriers from the pixel electrode into the alignment film even in the case of a liquid crystal cell including an entirely solid pixel electrode.

Further, in Comparative Example 2, the rDC after the power-on test was lower than in Comparative Example 1. This is presumably because as follows. That is, in Comparative Example 2, no opening was provided for the pixel electrode so that a uniform DC offset voltage was applied to the entire region of the liquid crystal layer. In contrast, in Comparative Example 1, the pixel electrode was provided with openings and the lines of electric force focused on the electrode portions in the liquid crystal layer, so that a greater DC offset voltage was applied to the electrode portions than to the opening portions. Such unevenness in the DC offset voltage presumably caused a higher rDC in Comparative Example 1 than in Comparative Example 2. This demonstrates that the presence of an electrode provided with slits can more effectively reduce the rDC.

In all of the examples and comparative examples, no change in contrast ratio was observed between the initial value and the value after the power-on test. This demonstrates that image sticking observed in the comparative examples was caused by an influence of an electric charge localized in the alignment film.

Examples 2-1 to 2-4 and Comparative Example 3

(Preparation of Liquid Crystal Alignment Agent)

The first polymer A1-3 and the second polymer B1 at a weight ratio of 19:1, 9:1, 2:1, 1:1, or 1:2 were mixed with a solution mixture of NMP and γ-butyrolactone, whereby a liquid crystal alignment agent was prepared.

(Production of Liquid Crystal Cell)

An array substrate including an ITO electrode provided with opening portions and a counter substrate including an ITO electrode provided with no opening portions were prepared. The liquid crystal alignment agent obtained above was applied to a surface of each substrate, and then pre-baked, post-baked, and subjected to photo-alignment treatment as in Example 1-1. Thereby, an array substrate and a counter substrate were produced each including a double-layered vertical alignment film containing a photo-reactive group. Subsequently, as in Example 1-1, the liquid crystal material was dropped and the substrates were attached to each other, whereby a liquid crystal cell of each of Examples 2-1 to 2-4 and Comparative Example 3 was produced.

For Examples 2-1 to 2-4 and Comparative Example 3, the high-temperature power-on test was performed as in Example 1-1 on a backlight, and the initial VHR, rDC, and CR and those after the power-on test were determined. The results of Examples 1-3 and 2-1 to 2-4 and Comparative Example 3 are shown in the following Table 2.

TABLE 2

|  | First polymer | Second polymer | Weight ratio A:B | Initial | | | After power-on test | | |
| --- | --- | --- | --- | --- | --- | --- | --- | --- | --- |
|  |  |  |  | VHR (%) | rDC (mV) | CR | VHR (%) | rDC (mV) | CR |
| Example 2-1 | A1-3 m1 = 0.1 | B1 | 19:1 | 99.5 | −10 | 3000 | 99.4 | −10 | 3400 |
| Example 2-2 | A1-3 m1 = 0.1 | B1 | 9:1 | 99.5 | −10 | 3000 | 99.3 | 0 | 3000 |
| Example 1-3 | A1-3 m1 = 0.1 | B1 | 4:1 | 99.5 | −10 | 3000 | 99.3 | 10 | 3000 |
| Example 2-3 | A1-3 m1 = 0.1 | B1 | 2:1 | 99.5 | 0 | 3000 | 99.0 | 30 | 3000 |
| Example 2-4 | A1-3 m1 = 0.1 | B1 | 1:1 | 99.3 | 0 | 3000 | 98.7 | 60 | 3000 |
| Comparative Example 3 | A1-3 m1 = 0.1 | B1 | 1:2 | 99.1 | 20 | 3000 | 97.9 | 200 | 3000 |

Table 2 demonstrates that the VHR was less reduced and the rDC was less increased after the power-on test in each of Examples 1-3 and 2-1 to 2-4 in which the first polymer had a weight that is equal to or greater than the weight of the second polymer in the alignment film. In Example 2-1 in which the first polymer had a higher weight proportion, the VHR was less reduced and the rDC was less increased after the power-on test, but the pre-tilt angle after the photo-alignment treatment was greater than the desired value, 87.5°. This is presumably because the amount of the first polymer present on the second surface of the alignment film in contact with the liquid crystal layer was larger than in the other examples, so that a smaller amount of the second polymer contributed to the alignment of liquid crystal molecules. The results of Example 2-1 demonstrate that the weight ratio of the first polymer to the second polymer in the alignment film is preferably 1:1 to 9:1 so as to achieve a desired pre-tilt angle relative to the vertical alignment film.

In contrast, in Comparative Example 3 in which the second polymer had a greater weight than the first polymer, presumably, the amount of the polysiloxane structure for the surface of the pixel electrode was insufficient, failing to sufficiently reduce injection of carriers from the pixel electrode into the alignment film. Thereby, presumably, the VHR was reduced and the rDC was significantly increased after the power-on test.

Examples 3-1 to 3-4 and Comparative Example 4

(Preparation of Liquid Crystal Alignment Agent)

The first polymer A1-1, A1-2, A1-3, A1-4, or A1-5 and the second polymer B2 containing a polysiloxane represented by the following formula (6) at a weight ratio of 85:15 were mixed with a solution mixture of NMP and γ-butyrolactone, whereby a liquid crystal alignment agent was prepared. For the second polymer B2, m3 in the following formula (6) was 0.5.

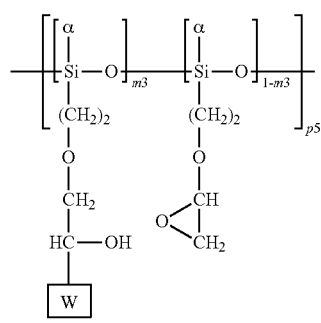
(6)

In the formula, α is a methoxy group; W is a side chain; and p5 represents the number of repeats, and is an integer of 1 or greater.

In the formula (6), the amounts of the structure represented by the following formula (W-4-1) and the structure represented by the following formula (W-4-2) introduced into the side chains W were adjusted to be a ratio of 1:1.

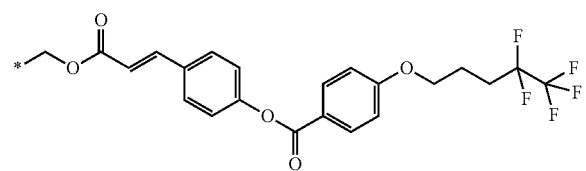
(W-4-1)

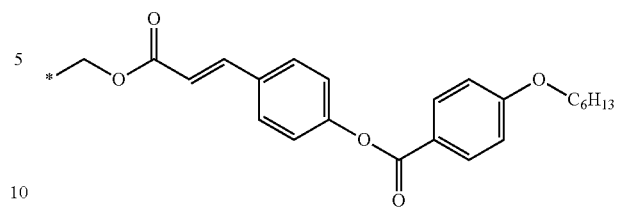
(W-4-2)

(Production of Liquid Crystal Cell)

An array substrate including an ITO electrode provided with opening portions and a counter substrate including an ITO electrode provided with no opening portions were prepared, and the liquid crystal alignment agent obtained above was applied to the surface of each substrate. Then, an array substrate and a counter substrate each including a double-layered vertical alignment film containing a photo-reactive group were produced in the same manner as in Example 1-1, except that the post-baking temperature was 230° C. and the photo-alignment treatment was performed so as to give a pre-tilt angle of 87.7°. Subsequently, as in Example 1-1, the liquid crystal material was dropped and the substrates were attached to each other, whereby a liquid crystal cell of each of Examples 3-1 to 3-4 and Comparative Example 4 was produced. Examples 3-1 to 3-4 and Comparative Example 4 provide specific examples of the liquid crystal display device 100B.

For Examples 3-1 to 3-4 and Comparative Example 4, the high-temperature power-on test was performed as in Example 1-1 on a backlight, and the initial VHR, rDC, and CR and those after the power-on test were determined. The results are shown in the following Table 3.

TABLE 3

| | First polymer | Second polymer | Weight ratio A:B | Initial VHR (%) | Initial rDC (mV) | Initial CR | After power-on test VHR (%) | After power-on test rDC (mV) | After power-on test CR |
|---|---|---|---|---|---|---|---|---|---|
| Example 3-1 | A1-1 m1 = 0.001 | B2 | 85:15 | 99.6 | −20 | 3000 | 99.3 | 20 | 3000 |
| Example 3-2 | A1-2 m1 = 0.01 | B2 | 85:15 | 99.6 | −20 | 3000 | 99.4 | 0 | 3000 |
| Example 3-3 | A1-3 m1 = 0.1 | B2 | 85:15 | 99.6 | −30 | 3000 | 99.6 | −10 | 3000 |
| Example 3-4 | A1-4 m1 = 0.2 | B2 | 85:15 | 99.6 | −30 | 3000 | 99.6 | −10 | 3000 |
| Comparative Example 4 | A1-5 m1 = 0 | B2 | 85:15 | 99.5 | 0 | 3000 | 99.0 | 100 | 3000 |

Table 3 demonstrates the following. Although the origin of the main chain of the second polymer was changed to a polysiloxane in Examples 3-1 to 3-4, the alignment film contained the first polymer containing a polysiloxane structure in a side chain as in Example 1-1 to 1-4, so that the polysiloxane structure was presumably distributed on the surface of the pixel electrode, reducing injection of carriers from the pixel electrode into the alignment film. This presumably resulted in no change in resistance of the alignment film and reductions in a decrease in VHR and an increase in rDC after the power-on test.

Examples 4-1 to 4-4 and Comparative Example 5

The following describes production of a multi-domain vertical alignment (MVA) mode liquid crystal cell using a substrate provided with a rib and a substrate in which an electrode is provided with slits. A vertical alignment film containing no photo-reactive group was formed on a surface of each substrate.

(Preparation of Liquid Crystal Alignment Agent)

A first polymer A2-1 containing a polyamic acid represented by the following formula (2) wherein m1 is 0.001, a first polymer A2-2 wherein m1 is 0.01, a first polymer A2-3 wherein m1 is 0.1, a first polymer A2-4 wherein m1 is 0.2, and a first polymer A2-5 wherein m1 is 0 were synthesized. One of the first polymers A2-1 to A2-5 and the second polymer B3 containing a polyamic acid represented by the following formula (4) at a weight ratio of 7:3 were mixed with a solution mixture of NMP and γ-butyrolactone, whereby a liquid crystal alignment agent was prepared.

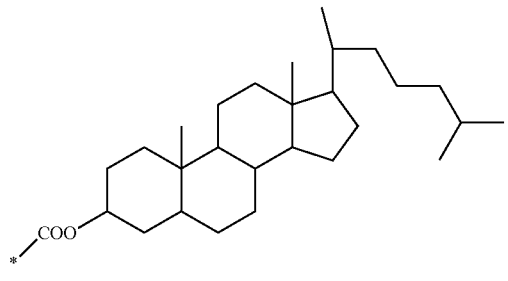

(W-2-1)

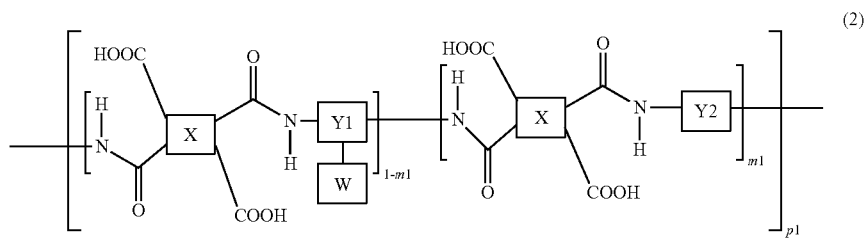

(2)

In the formula, X is a structure represented by the following formula (X-5); Y1 is a structure represented by the following formula (Y1-1); Y2 is a structure represented by the following formula (Y2-1); W is a structure represented by the following formula (W-2-1); and p1 represents the number of repeats, and is an integer of 1 or greater.

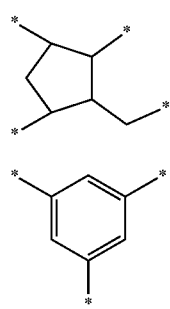

(X-5)

(Y1-1)

(Y2-1)

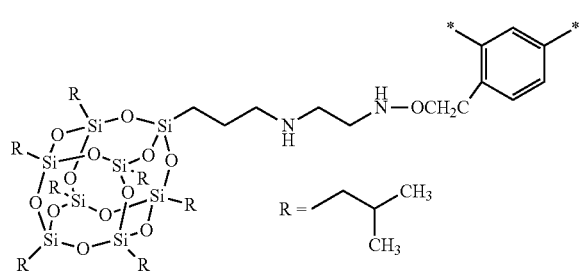

In the formula, R is the structure represented by the formula (1-a).

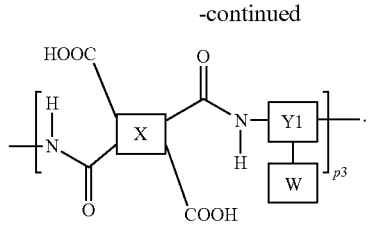

(4)

In the formula, X is the structure represented by the formula (X-5); Y1 is the structure represented by the formula (Y1-1); W is the structure represented by the formula (W-2-1); and p3 represents the number of repeats, and is an integer of 1 or greater.

(Production of Liquid Crystal Cell)

An array substrate including as a pixel electrode an ITO electrode provided with opening portions and a counter substrate including as a counter electrode an ITO electrode provided with no opening portions but with protrusions (ribs) were prepared. The liquid crystal alignment agent obtained above was applied to a surface of each substrate, and then pre-baked and post-baked in the same manner as in Example 1-1 but without photo-alignment treatment, whereby an array substrate and a counter substrate were produced each including a vertical alignment film containing no photo-reactive group.

An ultraviolet-curable sealant was applied in a predetermined pattern to one of the substrates using a dispenser, while a negative liquid crystal material was dropped to a predetermined position on the other substrate. The liquid crystal material used had a nematic-isotropic liquid phase transition temperature (Tni) of 80° C., an anisotropy of dielectric constant (Δε) of −3.2, and a refractive index anisotropy (Δn) of 0.10. Attachment of the substrates, curing of the sealant, and the re-alignment treatment were performed in the same manner as in Example 1-1. The workpiece was then cooled down to room temperature, whereby a liquid crystal cell of each of Examples 4-1 to 4-4 and Comparative Example 5 was produced.

For Examples 4-1 to 4-4 and Comparative Example 5, the high-temperature power-on test was performed as in Example 1-1 on a backlight, and the initial VHR, rDC, and CR and those after the power-on test were determined. The results are shown in the following Table 4.

TABLE 4

|  | First polymer | Second polymer | Weight ratio A:B | Initial VHR (%) | rDC (mV) | CR | After power-on test VHR (%) | rDC (mV) | CR |
|---|---|---|---|---|---|---|---|---|---|
| Example 4-1 | A2-1 m1 = 0.001 | B3 | 7:3 | 99.2 | 40 | 1800 | 98.8 | 50 | 1800 |
| Example 4-2 | A2-2 m1 = 0.01 | B3 | 7:3 | 99.2 | 30 | 1800 | 98.8 | 30 | 1800 |
| Example 4-3 | A2-3 m1 = 0.1 | B3 | 7:3 | 99.2 | 30 | 1800 | 99.0 | 30 | 1800 |
| Example 4-4 | A2-4 m1 = 0.2 | B3 | 7:3 | 99.2 | 20 | 1800 | 99.1 | 20 | 1800 |
| Comparative Example 5 | A2-5 m1 = 0 | B3 | 7:3 | 99.0 | 50 | 1800 | 97.8 | 170 | 1800 |

Table 4 demonstrates that, even in Examples 4-1 to 4-4 in which the MVA mode with a vertical alignment film containing no photo-reactive group was used, the alignment film contained the first polymer containing a polysiloxane structure in a side chain as in Examples 1-1 to 1-4, so that the polysiloxane structure was presumably distributed on the surface of the pixel electrode, reducing injection of carriers from the pixel electrode into the alignment film. This presumably resulted in no change in resistance of the alignment film and reductions in a decrease in VHR and an increase in rDC after the power-on test.

Example 5 and Comparative Example 6

The following describes production of a MVA mode liquid crystal cell including an alignment controlling layer (PSA) on a vertical alignment film containing no photo-reactive group.
(Preparation of Liquid Crystal Alignment Agent)
One of the first polymers A2-4 and A2-5 and the second polymer B3 at a weight ratio of 7:3 were mixed with a solution mixture of NMP and γ-butyrolactone, whereby a liquid crystal alignment agent was prepared.
(Production of Liquid Crystal Cell)
An array substrate including an ITO electrode provided with opening portions and a counter substrate including an ITO electrode provided with no opening portions were prepared. The liquid crystal alignment agent obtained above was applied to a surface of each substrate, and then prebaked and post-baked in the same manner as in Example 1-1 but without photo-alignment treatment, whereby an array substrate and a counter substrate were produced each including a vertical alignment film containing no photo-reactive group as in Example 1-1.

An ultraviolet-curable sealant was applied in a predetermined pattern to one of the substrates using a dispenser, while a liquid crystal composition containing a monomer for PSA formation represented by the following formula (16) and a negative liquid crystal material was dropped to a predetermined position on the other substrate. The liquid crystal material used had a nematic-isotropic liquid phase transition temperature (Tni) of 85° C., an anisotropy of dielectric constant (Δε) of −2.8, and a refractive index anisotropy (Δn) of 0.095. Attachment of the substrates, curing of the sealant, and the re-alignment treatment were performed in the same manner as in Example 1-1. The workpiece was then cooled down to room temperature. Finally, the liquid crystal layer was irradiated with 5 J/cm² of ultraviolet light while a voltage of 10 V was applied thereto, so that the monomer for PSA formation was polymerized and the alignment controlling layer was formed on the surface of the alignment film. Thereby, a liquid crystal cell of each of Example 5 and Comparative Example 6 was produced.

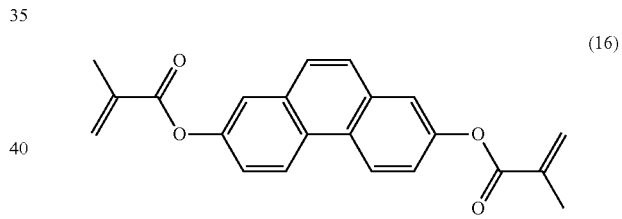

(16)

For Example 5 and Comparative Example 6, the high-temperature power-on test was performed as in Example 1-1 on a backlight, and the initial VHR, rDC, and CR and those after the power-on test were determined. The results are shown in the following Table 5.

TABLE 5

|  | First polymer | Second polymer | Weight ratio A:B | PSA | Initial VHR (%) | rDC (mV) | CR | After power-on test VHR (%) | rDC (mV) | CR |
|---|---|---|---|---|---|---|---|---|---|---|
| Example 5 | A2-4 m1 = 0.2 | B3 | 7:3 | Present | 99.5 | 0 | 1800 | 99.5 | 0 | 1800 |
| Comparative Example 6 | A2-5 m1 = 0 | B3 | 7:3 | Present | 99.5 | 10 | 1800 | 98.7 | 40 | 1800 |

Table 5 demonstrates that, even in Example 5 in which the alignment controlling layer was provided on the alignment film, the alignment film contained the first polymer containing a polysiloxane structure in a side chain as in Examples 1-4, 3-4, and 4-4, so that presumably the polysiloxane structure was distributed on the surface of the pixel electrode, reducing injection of carriers from the pixel electrode into the alignment film. This presumably resulted in no change in resistance of the alignment film and reductions in a decrease in VHR and an increase in rDC after the power-on test.

[Additional Remarks]

An aspect of the present invention relates to a substrate provided with an alignment film, including: a substrate including an electrode on a surface thereof; and an alignment film in contact with the electrode, the alignment film containing a first polymer that contains a polysiloxane structure in a side chain and a second polymer that contains a photo-reactive group or a vertically aligning functional group, the alignment film including a first surface that is placed on a side close to the electrode and contains the first polymer and a second surface that is placed on a side opposite to the first surface and contains the second polymer, the first polymer having a weight that is equal to or greater than a weight of the second polymer in the alignment film.

In an embodiment of the present invention, the polysiloxane structure may be a silsesquioxane group.

In an embodiment of the present invention, the photo-reactive group may contain a cinnamate group, a chalcone group, an azobenzene group, or a coumarin group.

In an embodiment of the present invention, the vertically aligning functional group may contain an alkyl group or a cholesterol group.

In an embodiment of the present invention, the first polymer may contain a main chain that is derived from a polyamic acid or a polyimide.

In an embodiment of the present invention, the first polymer and the second polymer may give a weight ratio of 1:1 to 9:1 in the alignment film.

In an embodiment of the present invention, the silsesquioxane group may be a structure represented by the following formula (1):

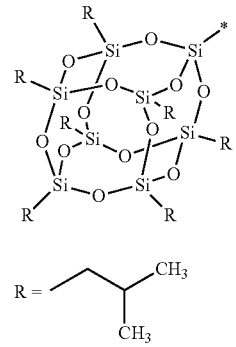

(1)

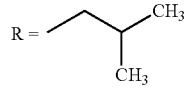

(1-a)

wherein R is a structure represented by the above formula (1-a).

In an embodiment of the present invention, the first polymer may contain a structure represented by the following formula (2) or a structure represented by the following formula (3):

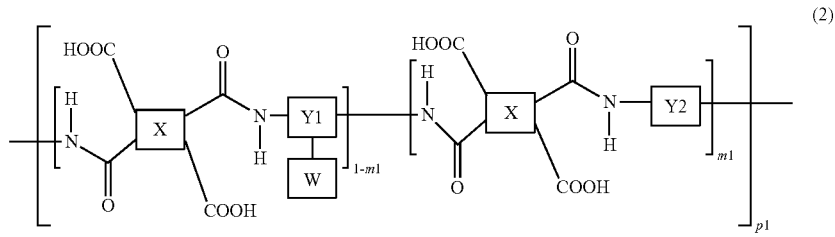

(2)

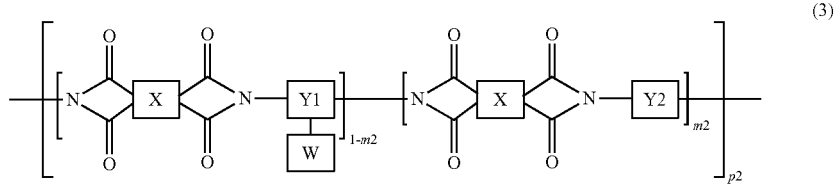

(3)

wherein

X is a structure represented by any of the following formulae (X-1) to (X-12);

Y1 is a structure represented by any of the following formulae (Y1-1) to (Y1-16);

Y2 is a structure represented by the following formula (Y2-1);

W is a side chain;

m1 and m2 are each a real number greater than 0 and smaller than 1; and p1 and p2 each represent the number of repeats, and are each an integer of 1 or greater.

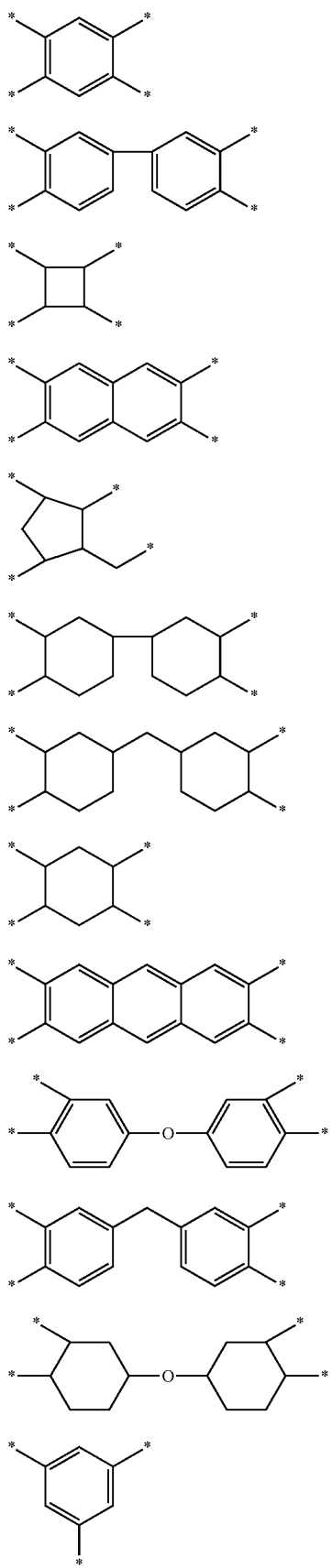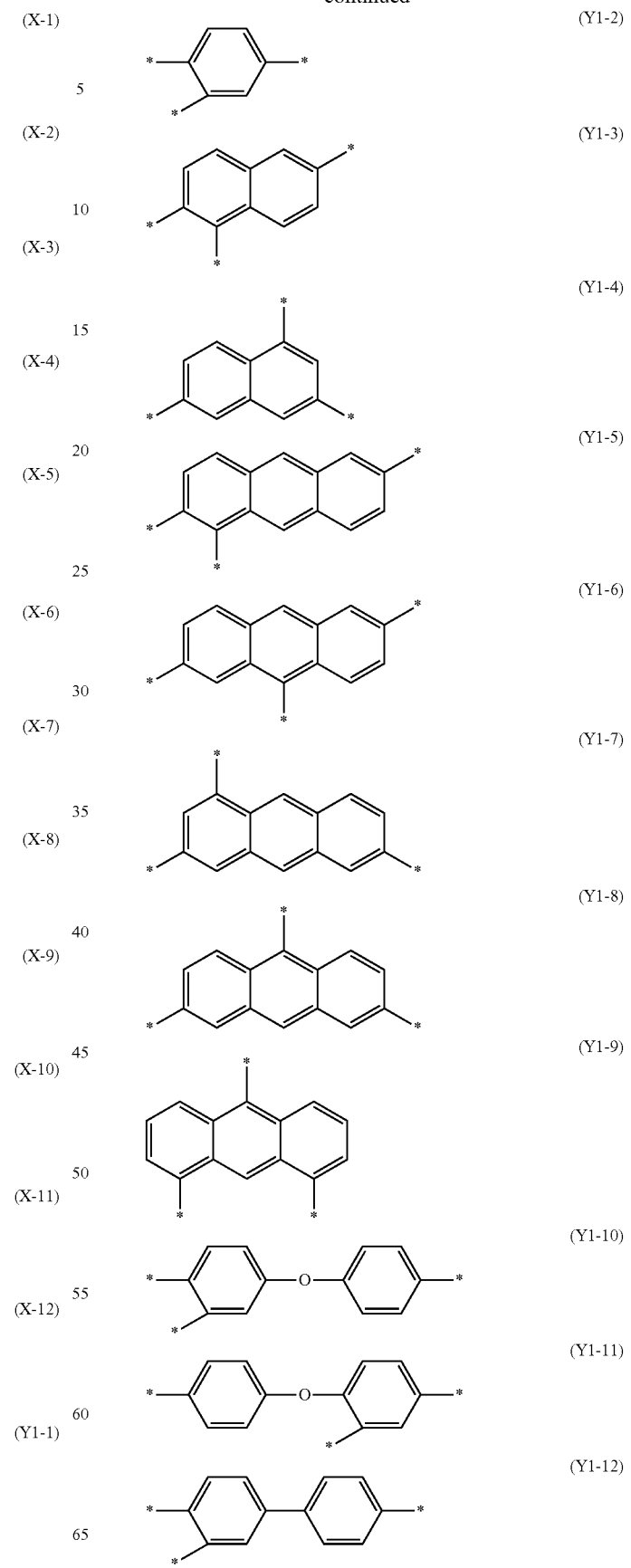

-continued

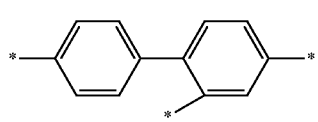
(Y1-13)

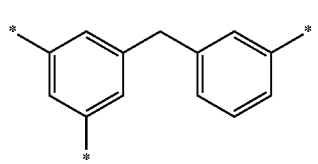
(Y1-14)

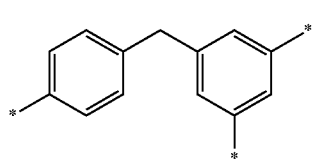
(Y1-15)

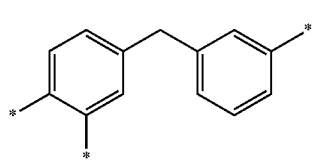
(Y1-16)

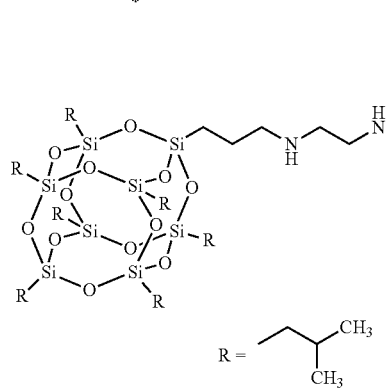
(Y2-1)

In an embodiment of the present invention, m1 and m2 each may be not smaller than 0.001 but smaller than 0.3 in the formulae (2) and (3).

In an embodiment of the present invention, the electrode may be provided with a slit.

Another aspect of the present invention relates to a liquid crystal display device including, in the stated order: an array substrate including a pixel electrode; an alignment film in contact with the pixel electrode; a liquid crystal layer containing a liquid crystal molecule; and a counter substrate including a counter electrode, the array substrate and the alignment film constituting a stack, the stack being the substrate provided with an alignment film of the present invention.

In another embodiment of the present invention, the pixel electrode or the counter electrode may be provided with a slit.

In another embodiment of the present invention, the pixel electrode may be in contact with the polysiloxane structure of the first polymer contained in the alignment film.

In another embodiment of the present invention, the liquid crystal molecule may have a pre-tilt angle of 87.5° to 88.0°.

Any of these embodiments of the present invention described above may appropriately be combined with each other within the spirit of the present invention.

What is claimed is:

1. A substrate provided with an alignment film, comprising:
    a substrate including an electrode on a surface thereof; and
    an alignment film in contact with the electrode, for aligning liquid crystal molecules,
    the alignment film containing a first polymer that contains a polysiloxane structure in a side chain and a second polymer that contains a photo-reactive group or a vertically aligning functional group,
    the alignment film including a first surface that is placed on a side close to the electrode and contains the first polymer and a second surface that is placed on a side opposite to the first surface and contains the second polymer,
    the first polymer having a weight that is equal to or greater than a weight of the second polymer in the alignment film,
    wherein the first polymer contains a structure represented by the following formula (2) or a structure represented by the following formula (3):

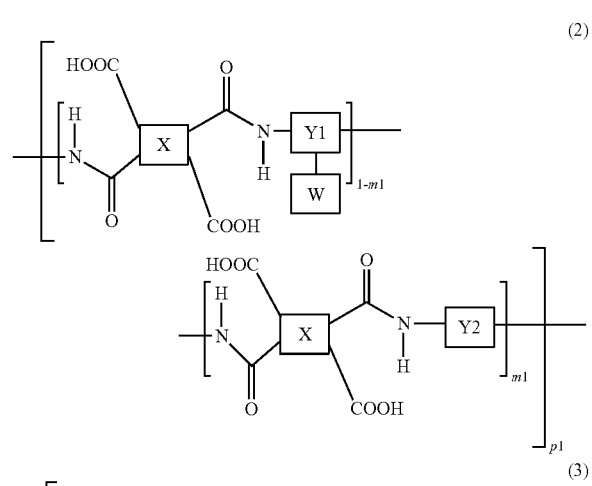
(2)

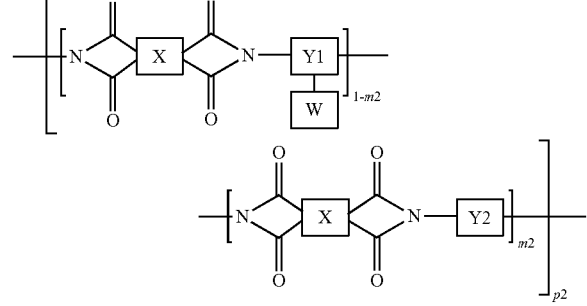
(3)

wherein
X is a structure represented by any one of the following formulae (X-1) to (X-12);
Y1 is a structure represented by any of the following formulae (Y1-1) to (Y1-16);
Y2 is a structure represented by the following formula (Y2-1);
W is a side chain;
m1 and m2 are each a real number greater than 0 and smaller than 1; and
p1 and p2 each represent the number of repeats, and are each an integer of 1 or greater,

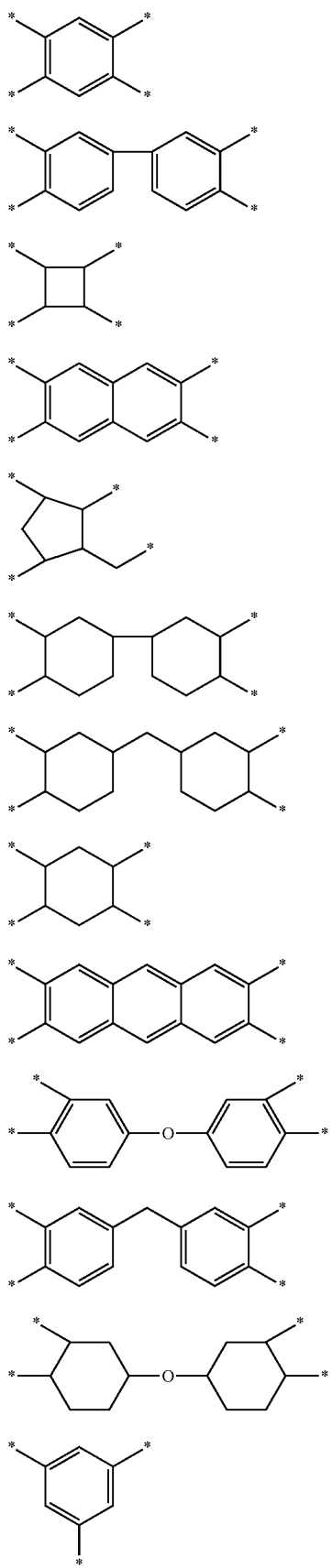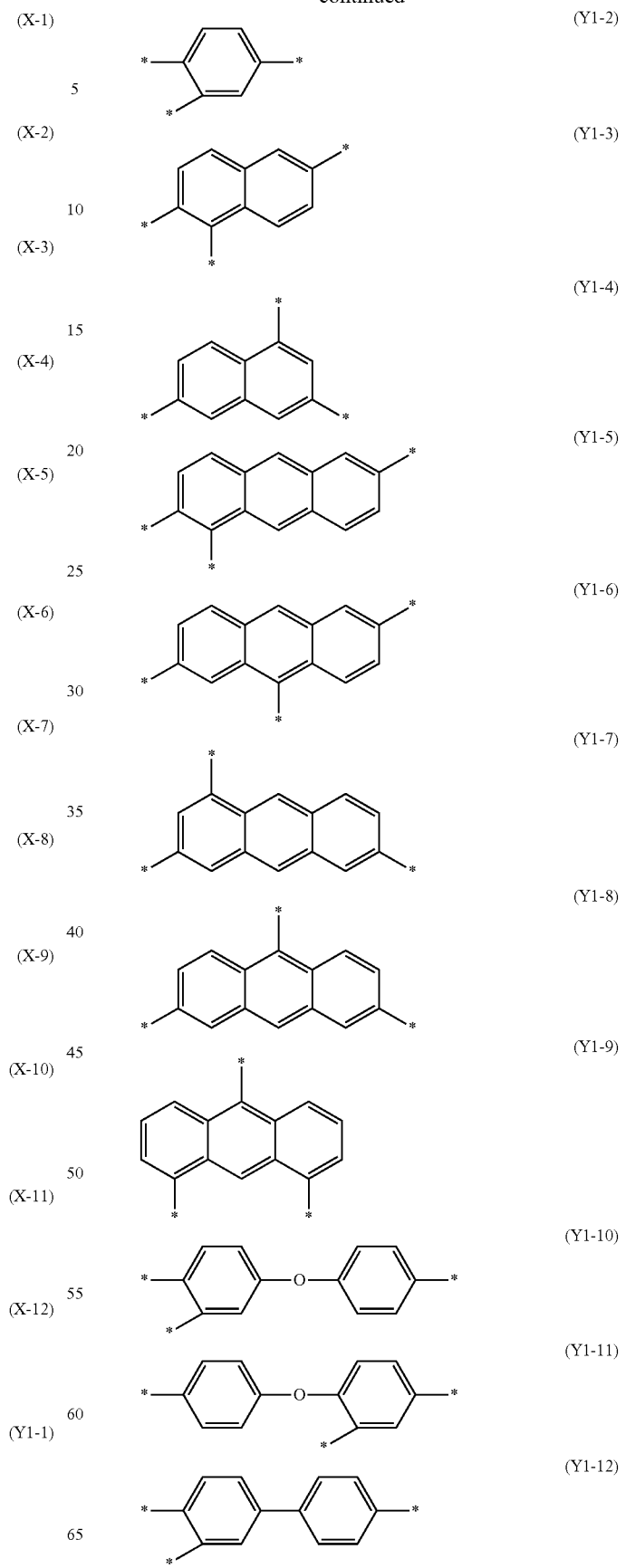

-continued

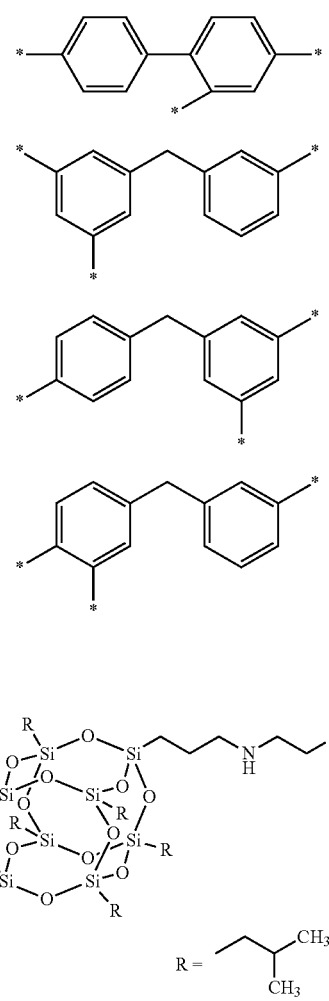

(Y1-13)

(Y1-14)

(Y1-15)

(Y1-16)

(Y2-1)

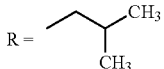

2. The substrate provided with an alignment film according to claim 1,
   wherein the photo-reactive group contains a cinnamate group, a chalcone group, an azobenzene group, or a coumarin group.

3. The substrate provided with an alignment, film according to claim 1,
   wherein the vertically aligning functional group contains an alkyl group or a cholesterol group.

4. The substrate provided with an alignment film according to claim 1, wherein the first polymer contains a main chain that is derived from a polyamic acid or a polyimide.

5. The substrate provided with an alignment film according to claim 1,
   wherein the first polymer and the second polymer give a weight ratio of 1:1 to 9:1 in the alignment film.

6. The substrate provided with an alignment film according to claim 1,
   wherein m1 and m2 are each not smaller than 0.001 but smaller than 0.3 in the formulae (2) and (3).

7. A liquid crystal display device comprising, in the stated order:
   an array substrate including a pixel electrode;
   an alignment film in contact with the pixel electrode;
   a liquid crystal layer containing a liquid crystal molecule; and
   a counter substrate including a counter electrode,
   the array substrate and the alignment film constituting a stack, the stack being the substrate provided with an alignment film according to claim 1.

8. The liquid crystal display device according to claim 7,
   wherein the pixel electrode or the counter electrode is provided with a slit.

9. The liquid crystal display device according to claim 7,
   wherein the pixel electrode is in contact with the polysiloxane structure of the first polymer contained in the alignment film.

10. The liquid crystal display device according to claim 7,
    wherein the liquid crystal molecule has a pre-tilt angle of 87.5" to 88.0°.

\* \* \* \* \*